United States Patent
Bagnato et al.

(10) Patent No.: US 9,876,953 B2
(45) Date of Patent: Jan. 23, 2018

(54) OMNIDIRECTIONAL SENSOR ARRAY SYSTEM

(75) Inventors: Luigi Bagnato, Renens (CH); Laurent Jacques, Louvain-la-Neuve (BE); Pierre Vandergheynst, Ecublens (CH); Hossein Afshari, Renens (CH); Alexandre Schmid, Sion (CH); Yusuf Leblebici, Lutry (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 278 days.

(21) Appl. No.: 13/881,463

(22) PCT Filed: Oct. 31, 2011

(86) PCT No.: PCT/IB2011/054843
§ 371 (c)(1),
(2), (4) Date: Jul. 11, 2013

(87) PCT Pub. No.: WO2012/056437
PCT Pub. Date: May 3, 2012

(65) Prior Publication Data
US 2014/0146132 A1 May 29, 2014

(30) Foreign Application Priority Data

Oct. 29, 2010 (EP) .................................... 10189474

(51) Int. Cl.
H04N 5/232 (2006.01)
H04N 5/225 (2006.01)
(Continued)

(52) U.S. Cl.
CPC ..... *H04N 5/23238* (2013.01); *G02B 27/2228* (2013.01); *G03B 35/08* (2013.01);
(Continued)

(58) Field of Classification Search
CPC ............. H04N 5/23238; H04N 5/2258; H04N 5/2259; H04N 5/23206; G02B 27/2228; G03B 35/08; G03B 37/04
See application file for complete search history.

(56) References Cited

U.S. PATENT DOCUMENTS 7,126,630 B1 * 10/2006 Lee ........................ H04N 5/225
348/159
2005/0140786 A1 * 6/2005 Kaplinsky .......... H04N 5/23203
348/207.1

(Continued)

OTHER PUBLICATIONS

Didier Raboud, "The Panoptic Camera: Plenoptic Interpolation in an Omnidirectional Polydioptric Camera," Jan. 14, 2009, Ecole Polytechnique Federale de Lausanne, XP002671861, pp. 1-36.*

(Continued)

*Primary Examiner* — Thai Tran
*Assistant Examiner* — Christopher T Braniff
(74) *Attorney, Agent, or Firm* — Sheridan Ross P.C.

(57) ABSTRACT

An omnidirectional sensor array system, for example a panoptic camera, comprising a plurality of sensors arranged on a support of predetermined shape to acquire data, wherein said sensors are directional and wherein each sensor is attached to a processing node which comprises integrated electronics that carries out at least a portion of the signal processing algorithms locally in order to reduce the computational load of a central hardware unit.

20 Claims, 13 Drawing Sheets

(51) Int. Cl.
 *G02B 27/22* (2006.01)
 *G03B 35/08* (2006.01)
 *G03B 37/04* (2006.01)

(52) U.S. Cl.
 CPC .......... *G03B 37/04* (2013.01); *H04N 5/2258* (2013.01); *H04N 5/2259* (2013.01); *H04N 5/23206* (2013.01)

(56) References Cited

U.S. PATENT DOCUMENTS

| | | | | |
|---|---|---|---|---|
| 2005/0141607 | A1* | 6/2005 | Kaplinsky | H04N 5/232 375/240.2 |
| 2008/0211941 | A1* | 9/2008 | Deever | H04N 5/2258 348/262 |
| 2010/0265385 | A1* | 10/2010 | Knight | H04N 5/232 348/340 |
| 2011/0174998 | A1* | 7/2011 | Molnar | G01S 3/782 250/550 |

OTHER PUBLICATIONS

International Search Report prepared by the European Patent Office dated Apr. 11, 2012, for International Application No. PCT/IB2011/054843.
Written Opinion prepared by the European Patent Office dated Apr. 11, 2012, for International Application No. PCT/IB2011/054843.
Raboud: "The Panoptic Camera—Plenoptic interpolation in an omnidirectional polydioptric camera." Jan. 14, 2009, Ecole Polytechnique Federale de Lausanne.
Aliaga, et al. "Plenoptic Stitching: A Scalable Method for Reconstructing 3D Interactive Walkthroughs", SIGGRAPH '01 Proceedings of the 28$^{TH}$ Annual Conference on Computer Graphics and Interactive Techniques, Aug. 12, 2011-Aug. 17, 2001, pp. 443-450.
Nalwa: "A True Omni-Directional Viewer." Fullview—Bell Labs, Jan. 15, 1996, pp. 1-31.

* cited by examiner

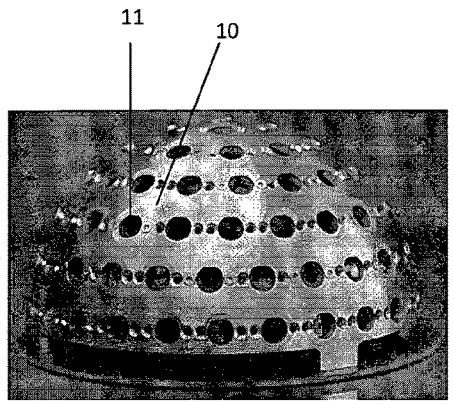
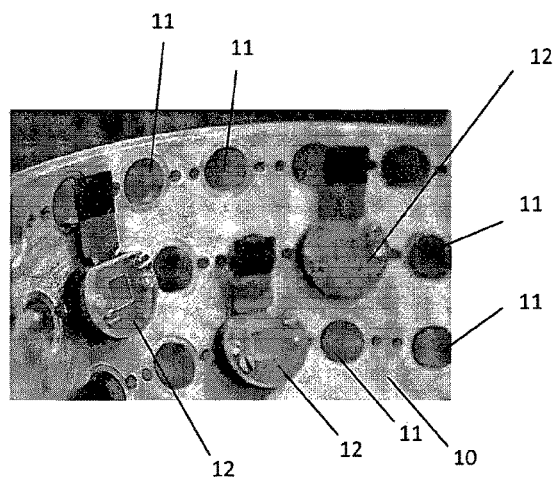
Fig.6(a)          Fig.6(b)
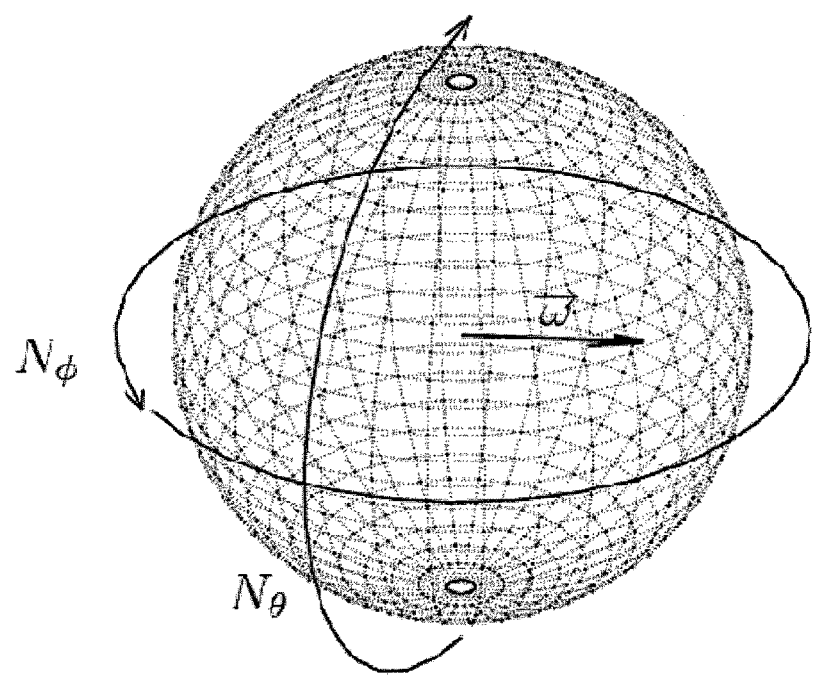
Fig.7

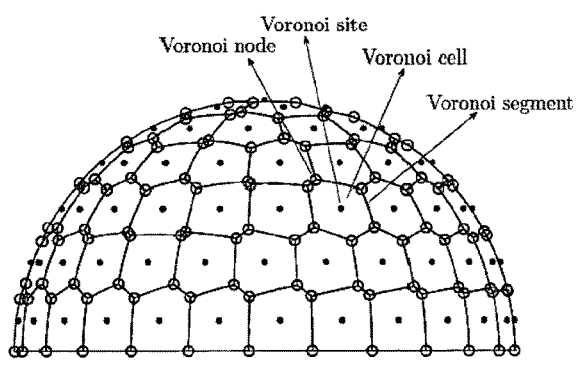 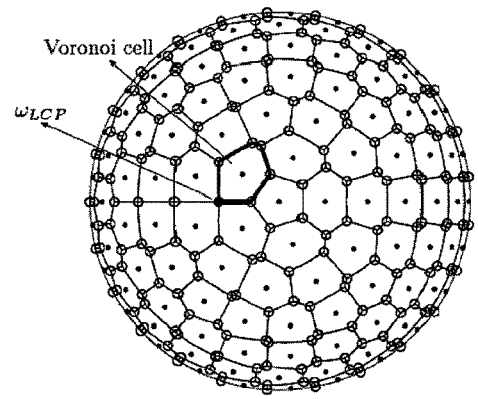
Fig.8(a)　　　　　　　　　　Fig.8(b)
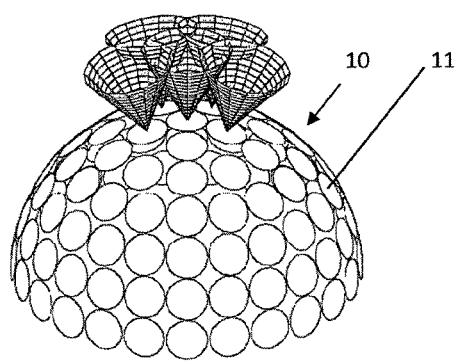 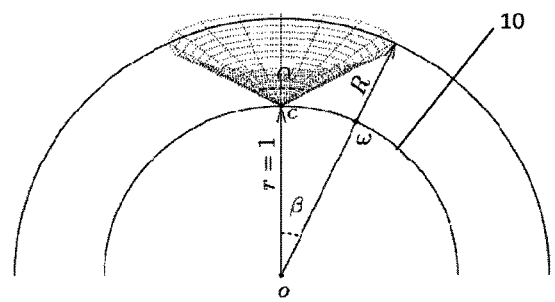
Fig.9(a)　　　　　　　　　　Fig.9(b)

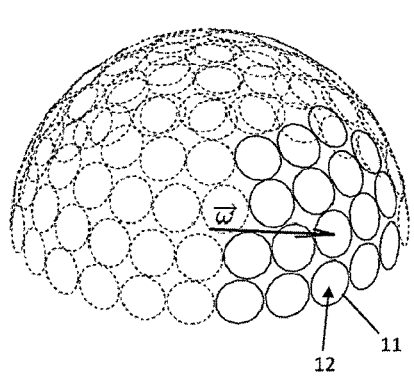 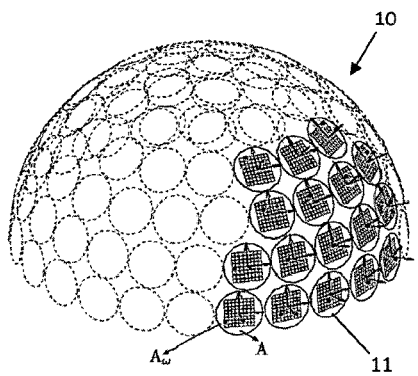
Fig.12(a)          Fig.12(b)
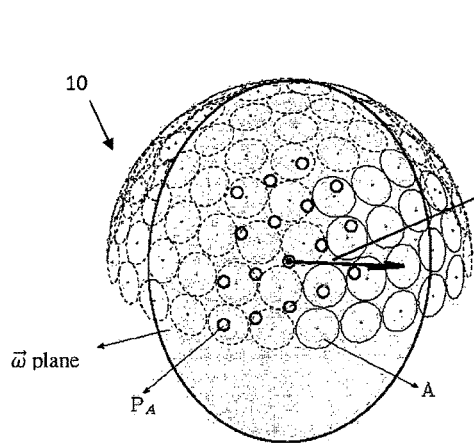 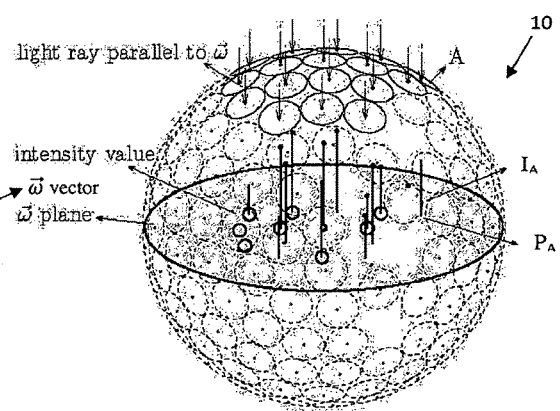
Fig.13(a)          Fig.13(b)

OMNIDIRECTIONAL SENSOR ARRAY SYSTEM

CROSS REFERENCE TO RELATED APPLICATIONS

This application is a national stage application under 35 U.S.C. 371 and claims the benefit of PCT Application No. PCT/IB2011/054843 having an international filing date of 31 Oct. 2011, which designated the United States, and which PCT application claimed the benefit of European Patent Application No. 10189474.9 filed 29 Oct. 2010, the disclosure of which is incorporated herein by reference.

FIELD OF THE INVENTION

The present invention concerns an omnidirectional sensor array system, for example a panoptic camera, that can be used in many applications such as general imaging, conference cameras, security and surveillance, live broadcast, medical imaging, games, architecture measurements, navigation etc.

The present invention more specifically concerns a system that implements a full-field-of-view light field camera. Contrary to traditional imagers, the system according to the present invention records and parameterize the set of light rays that intersect its operational base. Images can then be constructed in various forms and formats by dedicated algorithms that operate on the set of recorded light rays. As such, the system never records or stores or manipulates the full images produced at individual sensors. Rather it uses that information in real-time to construct the light field. The full light field information can also be used to calculate the depth in any direction sensed by the individual imagers. Then the final output of the system is user programmable and includes omnidirectional panoramic images or movies (i.e. reat time movies), sets of standard perspective images or movies, and any combination of these images with depth information. The system construction, data collection/processing and reconstruction algorithms are presented for an array of directional sensors, to be used to acquire omnidirectional information based on the collected data.

STATE OF THE ART

The very efficient visual system of flying insects can provide insightful inspiration for advanced hardware vision systems. The common fly has two faceted eyes that provide it with efficient omnidirectional vision. A fly's faceted eye is an omnidirectional vision system composed of several thousand simple sensors called ommatidias, see reference [1].

Early attempts in fabricating an omnidirectional vision are based on regular sensors capturing the image formed on a parabolic mirror see reference [3]. An alternate solution has been proposed in reference [4], where a number of commercial cameras are placed in orbital plane, enabling the post processing reconstruction of a panoramic image used as an omnidirectional vision turret for robotic applications. Along the same lines, a large size stereoscopic omnidirectional camera prototype using commercial camera components is presented in reference [5]. Recently, two attempts in miniaturizing the omnidirectional vision system have been made, specially using microfabrication technologies into mimicking the insect compound eye see references [6], [7].

Solutions which have been proposed so far to realize omnidirectional vision suffer from various flaws which harms their practicality and effectiveness. Most of the proposed systems involve bulky or heterogeneous hardware, taking the form of computers or laser-based distance measurement systems prohibiting actual portability, three-dimensional mirrors which are very delicate to manipulate, may cause local image distortion due to a complex and difficult to guarantee fabrication process as well as misalignment with the imager. Alternatively, the attempts to realize micrometer size omnidirectional vision mainly focus on the vision system, where the data communication and image processing is not considered.

At the data management level, most omnidirectional imagers based on camera arrays work by collecting individual sensor images and stitching them together to create a panorama. This results in severe data throughput constraints in the system that make computation of these panoramas in embedded hardware difficult: the system must have enough buffer memory and computational power to access, temporarily store and manipulate all images recorded by the individual sensors composing the array. These constrains become even more drastic for real-time video, explaining the complete lack of fully embedded real-time omnidirectional arrays in the commercial and professional camera equipment market, at present.

US 2004/0246333 discloses a digital 3D/360° camera system. More specifically, this prior art refers to 3D and 360 degree omnidirectional image reconstruction based on the arrangement of multiple digital cameras with overlapping fields of view. The system includes a housing and a plurality of digital cameras are disposed on the housing. Each of the digital cameras has a field of view that overlaps the field of view of at least one other of the digital cameras to form a stereoscopic field of view. The system has a controller with a processor, a memory, a storage device, a clock, a communication interface, and a camera interface. The camera interface is in communication with each of the digital cameras. Also part of the disclosure of this prior art document is a method of using a digital 3D/360 camera system to create a 3-dimensional image model. The method includes a step using a digital 3D/360 camera system to capture digital image data having points of interest that are captured in the digital image data of at least two digital cameras. For each point of interest, the pixel vector from each of the at least two digital cameras is used to determine the position of the point of interest in a coordinate system relative to a system reference point. Publications WO 2006/110584 and US 2007/0126863 disclose a stereoscopic wide field of view imaging system. The stereoscopic imaging system incorporates a plurality of imaging devices or cameras and generates a high resolution, wide field of view image database from which images can be combined to provide wide field of view or panoramic or omni-directional images. Wide field of view or panoramic images include any combination of images to increase the width of the scene. A panoramic view can extend to a full 360°, in which the combined images form a full circle in a plane. Images can also be combined so that the wide field of view or panoramic view extends upwards or downwards from a plane. An omni-directional image extends a full 4[pi] steradians. Stereoscopic images are formed by locating the imaging devices with an appropriate offset in each observed direction, creating enough parallax to provide the third dimension of depth perception. The resulting left and right signals are fed to the respective left and right eyes of a person via a suitable display device to give a stereoscopic effect. The design naturally extends to maintain any desired image offset to satisfy application requirements. The still or video images are output to an end user or image display device, such as a head mounted display or video monitor or output to some specialized processing device to perform 3-D depth calculations, automated target recognition or some other imaging processing.

US 2008/0247672 discloses an image processing method for a multi-sensor network camera. The method includes: generating a plurality of full resolution images in Bayer array format (Bayer images) produced by a plurality of image sensors; interpolating a plurality of low resolution Bayer images from the full resolution Bayer images, respectively and without demosaicing the full resolution Bayer images, by respective plurality of pre-processors during the readout of the full resolution Bayer images from the sensors; storing the full resolution Bayer images and the resultant interpolated low resolution Bayer images in a plurality of buffer memories, respectively demosaicing the plurality of low resolution Bayer images to generate a corresponding plurality of demosaiced low resolution images. The method then transmits the plurality of demosaiced low resolution images (or full resolution images) over a computer network (to a user) for viewing.

US 2004/0027451 discloses an immersive imaging system that provides stereoscopic or monoscopic video acquisition, recording, playing back and transmitting the image data. Various embodiments provide adjustable stereoscopic capture ranges, analyses of image information, measurement of object distances in fields of view, and videoconferencing for 360° fields-of-view.

US 2002/0110275 and U.S. Pat. No. 6,327,381 disclose methods of synthesizing an image of a scene corresponding to the image of said scene which would be observed from a virtual viewpoint location. The method includes the step of providing a plurality of starting pixel data elements. Preferably, each said starting pixel data element incorporates data corresponding to illumination seen along a starting pixel ray vector associated with that starting pixel data element. Each said starting pixel ray vector desirably has a direction and an intercept on a known locus in the frame of reference of the scene. The direction of a synthetic pixel ray vector from the pixel through the virtual viewpoint location, and the intercept of the same vector on the locus are determined. The idea of a synthetic pixel ray vector can be envisioned by imagining a camera having its lens at the virtual viewpoint. A vector from a given pixel in the image plane of the imaginary camera would correspond to a synthetic pixel ray vector for that pixel. Using the direction and intercept of the synthetic pixel ray vector, one or more starting pixel data elements are selected. The selected starting pixel data elements are those associated with starting pixel ray vectors having directions and intercepts close to the direction and intercept of the synthetic pixel ray vector. The method further includes the step of deriving synthetic pixel data for the pixel of the synthesized image from the starting pixel data of the selected starting pixel data element or elements. Where only one starting pixel data element is selected, the data of that element can simply be copied as the data of the synthetic pixel. Where plural starting pixel data elements are selected, the step of deriving the synthetic pixel data typically includes the step of interpolating between the data of the selected starting pixel data elements.

Other prior art publications include the following documents:

JP3827912B2, JP4252377B, JP4262484B, JP2010283743, CN101825840, CN101561270, CN101511005, U.S. Pat. No. 6,809,887, WO02065786, JP2003141527, KR20060015460, KR20100109269, US2007014347, US2007097206, US 2008002023, US2005207487, U.S. Pat. No. 6,141,034, WO0244808, US2001020976, US2008298674, U.S. Pat. No. 7,773,121, CN101291427, CN101146231, US2003223468, US2002176004, CN2483913Y, EP0610863, U.S. Pat. No. 5,313,306, WO2005048600, US2004021767. EP1289317, US2002046218, JP2002262307, JP2001320736, WO2006124640, WO2005067318, WO9743854, U.S. Pat. No. 6,392,688, U.S. Pat. No. 4,355,328, WO2010052548, WO2009054683, US2002122113, EP1441307, US2010283828, EP1248235, U.S. Pat. No. 6,317,166, GB2477333, WO2004036894, US2007206945, WO2011059530, JP2002232988, JP2001136516, US2004257433, WO2006107934, US2006256113, EP0921376, US2001014171, U.S. Pat. No. 5,745,305, U.S. Pat. No. 5,023,725, US2004052450, U.S. Pat. No. 6,034,716, WO09750252, U.S. Pat. No. 6,002,430, U.S. Pat. No. 5,920,337, U.S. Pat. No. 5,745,126, US2004263611, DE20000603U, WO2007048197, WO9621197, US2009219381, WO0128309, FR2909778, US2005052543, U.S. Pat. No. 5,703,604, KR20070062690, JP2006033810, US2005141607, U.S. Pat. No. 5,200,818, US2011085027, EP2339863, EP2237227, WO2011071978, WO9701241.

SUMMARY OF THE INVENTION

It is an aim of the present invention is to improve the known devices.

It is a further aim of the present invention to provide an omnidirectional sensor, such as an optical sensor, that is simpler and more efficient than the known devices.

To fulfill such aims the present invention provides inter alia a novel hardware implementation of an omnidirectional image sensor which comprises a hemispherical arrangement of a large number of CMOS imagers, connecting to a layered arrangement of high-end FPGA systems in charge of data framing, and image processing.

In the invention, the whole system behaves as a light field camera, meaning that it is able to record and parameterize the set of light rays intersecting its operational base. A large variety of images can then be formed from the recorded light field by dedicated data processing algorithms. The whole system can thus synthesize virtual sensors with augmented capabilities in terms of field of view, resolution, depth sensitivity.

Preferably, interpolation algorithms process the recorded light field samples. The dense interpolated light field is then sampled to form standard perspective images. Image parameters, such as the direction and size of the field of view and the resolution of the end image can be fixed by external constraints.

Preferably, interpolation algorithms process the recorded light field samples. The dense interpolated light field is then sampled to form omnidirectional images in various formats and resolution. The system fetches only the information needed to construct the light rays necessary to estimate the output pixels locally without accessing, storing or stitching the individual imagers data.

Preferably, interpolation algorithms process the recorded light field samples. A linear system of equations relating depth to the partial derivatives of the dense interpolated light field is solved to compute depth information in all directions sensed by the camera. The system fetches only the information needed to construct the light rays necessary to estimate the output depth information locally without accessing, storing or comparing the individual imagers data.

In the invention, data is acquired by a continuum of sensors that are placed on a surface of variable shape. Each sensor must preferably be directional, but its nature is various, e.g. image, video, sound, ultrasound, etc. sensor.

Preferably, the directionality of the incoming data stream provides the basis to reconstruct the complete scene. The scene can be in the form of an image, or video or sound, etc. depending on the nature of the directional sensors in use.

Preferably, algorithms are provided that enable image reconstruction, video reconstruction which is applicable in all image-related sensor systems. Algorithms are provided to carry out omnidirectional image reconstruction, three-dimensional image reconstruction, depth-map estimation.

The combination of the continuum of sensors and the signal, image processing forms a virtual sensor which has enhanced capacities resulting from the compound capability of each individual sensor.

The system formed this way is scalable, and the number of real sensors and their characteristics in terms of the requested quality of acquisition may vary, e.g. resolution, sensitivity. Consequently, different qualities of the provided service are provided.

Each pixel of the virtual sensor thus created is constructed on the basis of light field information. The system queries the individual imagers to access locally just the information it needs to construct the current virtual output pixel. Accessing the required light field information for each output pixel enables optimizing the amount of computation and data flow in the system to achieve real-time performance on embedded architectures.

Each sensor can stream its data to some central hardware unit which carries out the signal, image, video processing algorithms.

Each sensor can be attached to a processing node which comprises integrated electronics that carries out a portion of the signal, video or image processing algorithms locally. This architecture is inherently parallelized in its fundamental operation principle, it is fully scalable in terms of node count and capabilities, and it enables reducing the computational load of the central processing unit.

The arrangement of sensors and their processing node can be placed in a network arrangement. This enables guaranteeing a target quality of service in the data routing and throughput, and dynamic load balancing of tasks among neighboring processing nodes.

The location of a virtual sensor can be placed along any incoming directional line that is issued from a source and captured by one real sensor.

The directionality of the virtual sensor can be random.

Using two or several systems described above and an additional layer of signal, image, video processing algorithms which processes the data from all systems, the location of the virtual sensor can be moved freely along any incoming directional line of any system.

In an embodiment, the invention provides an omnidirectional sensing device comprising a plurality of sensors arranged on a support of predetermined shape to acquire data, wherein said sensors are directional and wherein each sensor is attached to a processing node which comprises integrated electronics that carries out at least a portion of the signal processing algorithms locally in order to reduce the computational load of a central hardware unit.

The sensors may be cameras or other sensing devices, or a combination of different types of sensing devices.

In an embodiment, the shape of the support may be hemispherical or spherical or another shape.

The sensing device may be scalable such that the number of real sensors and their characteristics in terms of the requested quality of acquisition may vary, e.g. resolution, sensitivity.

In an embodiment, the sensors and their processing node may be placed in a network or interconnected network arrangement in order to guarantee a target quality of service in the data routing and throughput, and dynamic load balancing of tasks among neighboring processing nodes.

In an embodiment, the sensors may be optical (visible range), infrared, acoustic, ultrasound, and/or any particular combination of such directional sensor elements.

In an embodiment, the sensors may be cameras with different gain factors which allow to reconstruct high dynamic range images or videos.

In an embodiment, the sensors may be cameras with different frame rates and triggers and are used to reconstruct images or videos at frame rates higher than any individual imagers used.

In an embodiment, the sensors may comprise several cameras, wherein some cameras register visible light and other cameras register IR light such that the device can reconstruct images in both frequency bands. Any other light wavelength may be used as well, alone or in combination.

In an embodiment, the device may be used as a light field camera.

In an embodiment, a stereo pair of omnidirectional images may be rendered by light field interpolation.

In an embodiment, the system may compute an omnidirectional depth map.

The invention also concerns a system comprising at least a sensing device according to the present invention, computer means and a rendering means for rendering the information sensed by the sensing device.

In an embodiment, the rendering means may be a display and the information may be image related information.

DETAILED DESCRIPTION OF THE INVENTION

The present invention will be better understood from the following detailed description and drawings which show:

Figures 5A, 5B:
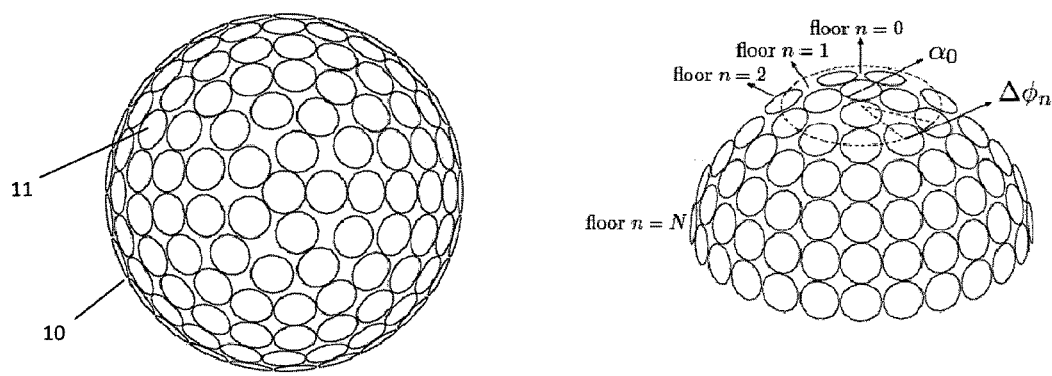
Figure 10A:
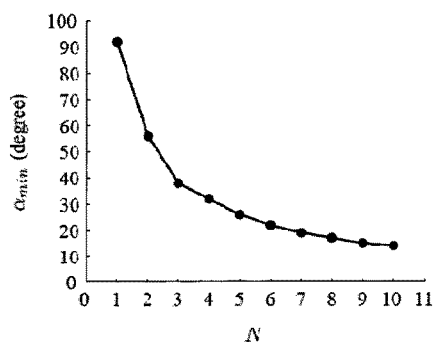
Figure 10B:
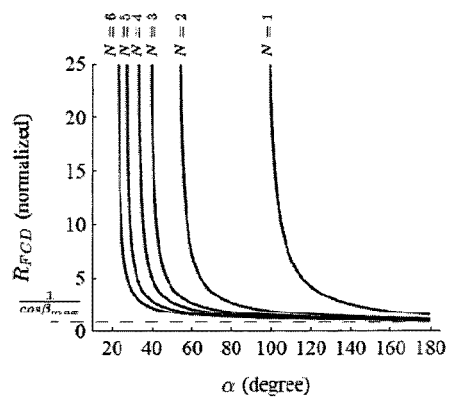
Figure 11A:
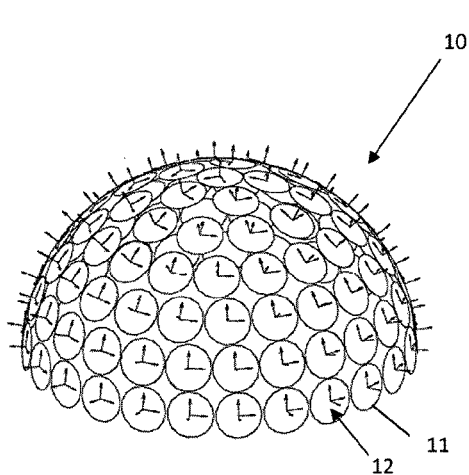
Figure 11B:
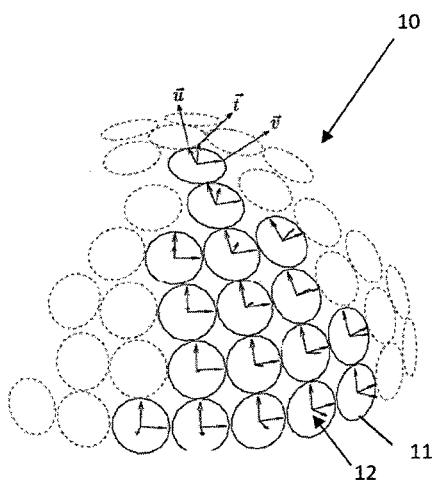
Figure 14A:
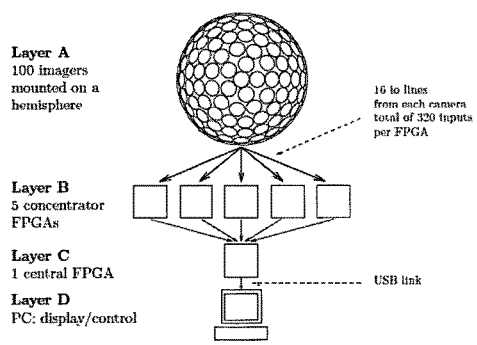
Figure 14B:
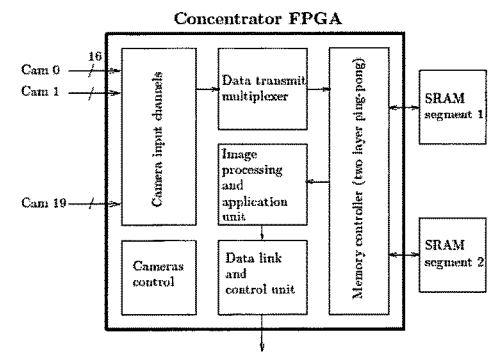
Figure 15A:
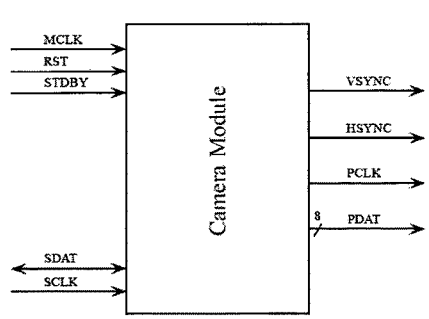
Figure 15B:
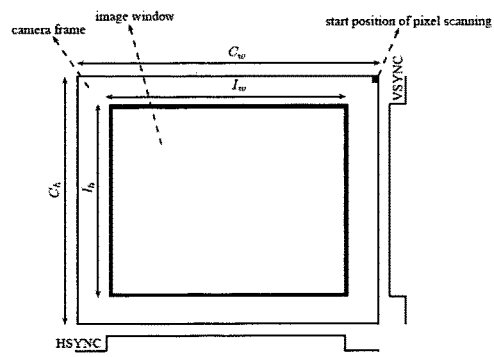
Figure 16:
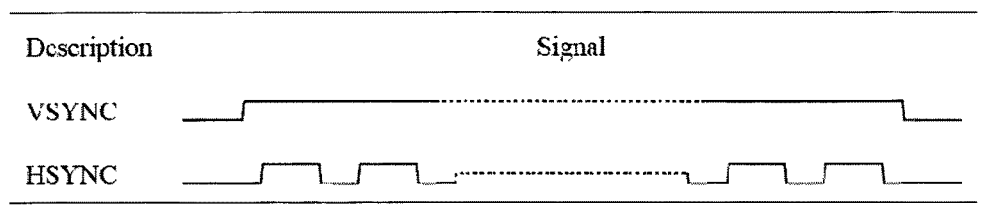
Figure 17:
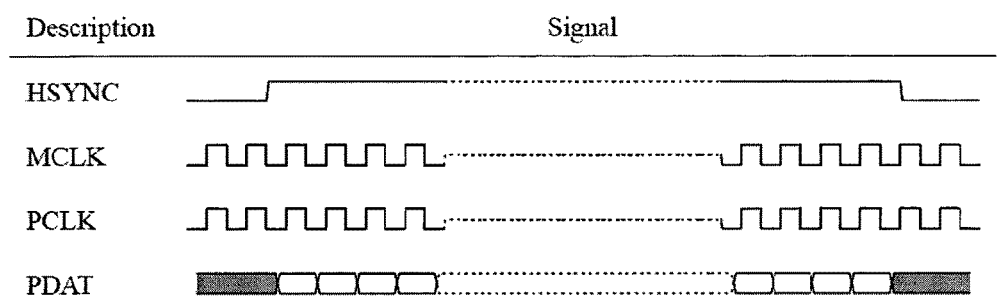
Figure 18:
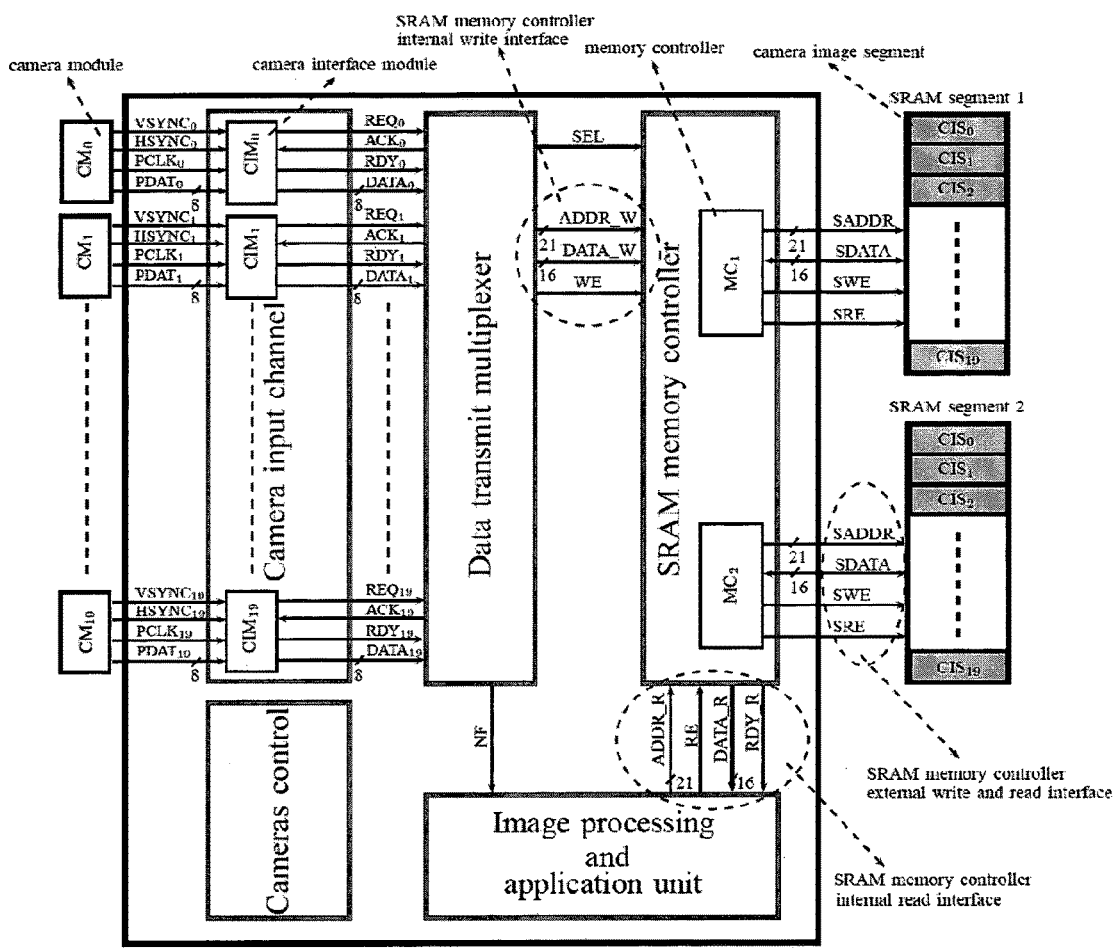
Figure 19:
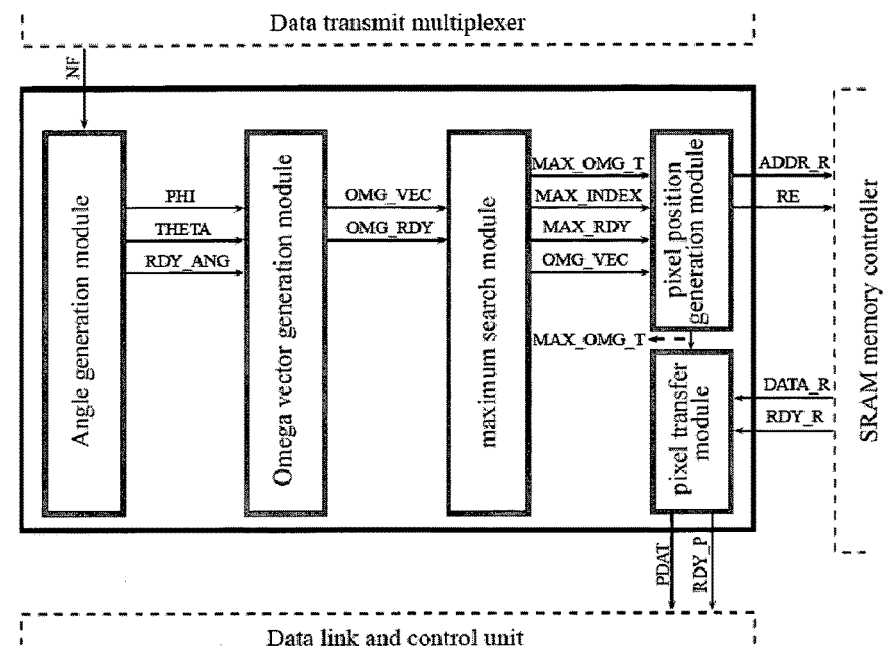
Figures 20A, 20B:
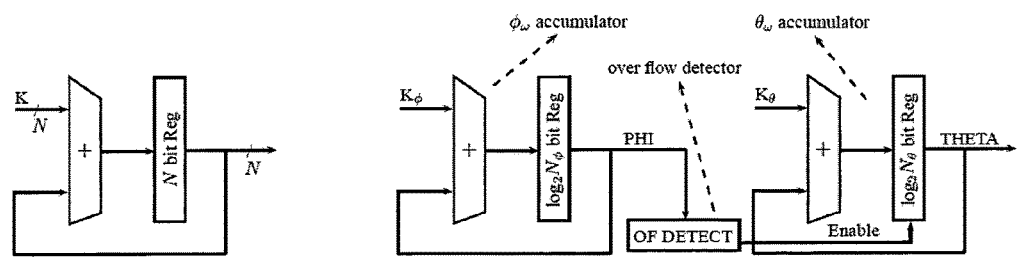
Figures 21A, 21B:
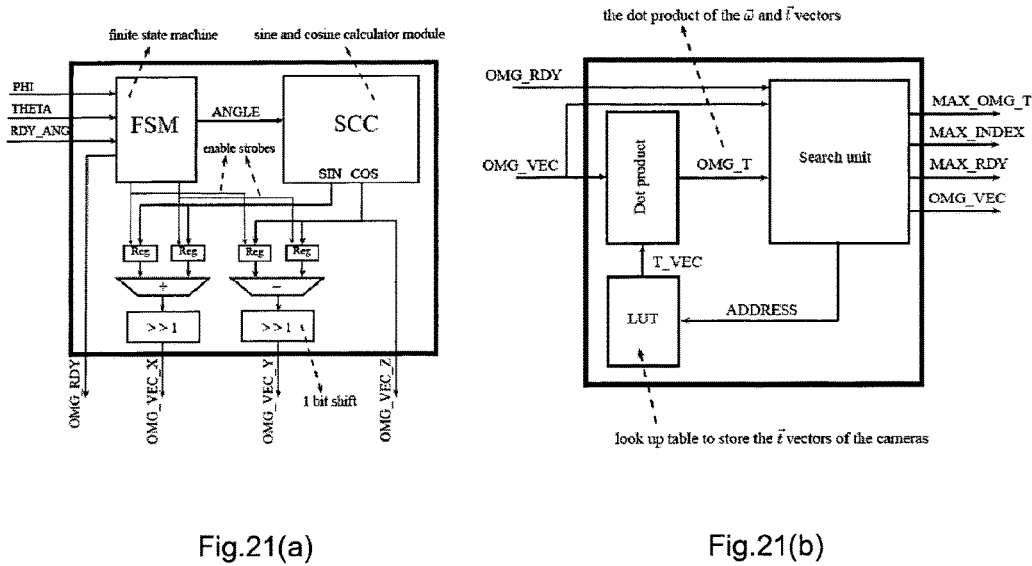
Figure 22:
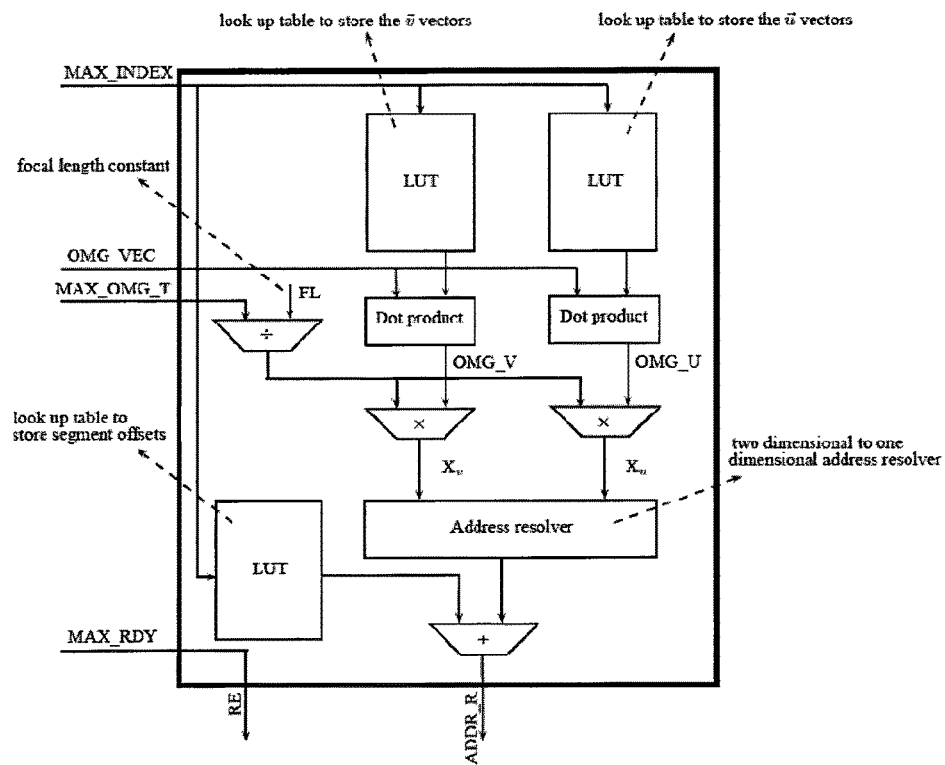

FIGS. 5(a) and 5(b) illustrate top and side views of a hemispherical structure with seven floors;

FIGS. 6(a) and 6(b) illustrate a side view and a inner view of a panoptic camera according to the present invention;

FIG. 7 illustrates the surface of a sphere with 32 latitude and 32 longitude pixels;

FIGS. 8(a) and 8(b) illustrate a side view and a top view of a Voronoi diagram;

FIGS. 9(a) and 9(b) illustrate pinhole camera with conical field of view;

FIG. 10(a) illustrates minimum angle of view for the camera of a device with N+1 latitude floors;

FIG. 10(b) illustrates normalized full coverage distance vs angle of view of a panoptic device according to the invention;

FIG. 11(a) illustrates radial and tangential vectors;

FIG. 11(b) illustrates a zoomed portion of FIG. 11(a);

FIG. 12(a) illustrates cameras contributing to a pixel position $\vec{\omega}$;

FIG. 12(b) illustrates contributing positions on the image frame of the contributing cameras (see FIG. 12(a));

FIG. 13(a) illustrates projection of the camera centers contributing in a direction $\vec{\omega}$ onto a planar surface normal to $\vec{\omega}$;

FIG. 13(b) illustrates another point of view of the camera centers projection;

FIG. 14(a) illustrates an architecture of a hardware system;

FIG. 14(b) illustrates an architecture of a concentrator FPGA;

FIG. 15(a) illustrates a camera module frame;

FIG. 15(b) illustrates camera frames;

FIG. 16 illustrates a timing diagram for VSYNC and HSYNC;

FIG. 17 illustrates a timing diagram for HSYNC, MCLK, PCLK and pixel data;

FIG. 18 illustrates an architecture of the concentrator FPGA;

FIG. 19 illustrates an image processing and application unit block diagram;

FIG. 20(a) illustrates an N bit accumulator;

FIG. 20(b) illustrates $\varphi_\omega$ and $\theta_\omega$ accumulators;

FIG. 21(a) illustrates an internal architecture of the omega vector generation module;

FIG. 21(b) illustrates the nearest camera position finder module;

FIG. 22 illustrates an internal architecture of the pixel position generation module.

The present invention will be further described by reference to a camera system, the principle being applicable to any type of sensing devices (i.e. not only optical) as disclosed in the application examples of the present specification.

Mimicking the faceted eye's concept, an omnidirectional camera can be realized by layering image sensors (for example CMOS sensors) over the surface of a spherical structure. The proposed camera is referred herein as the "panoptic camera".

The major design directive that is applied in the development of the panoptic camera relates to its inspiration from biology, and is derived into the following four working hypothesis, namely, i) integration of the vision acquisition and processing; the unique data acquisition system consists of identical image sensors, all of which are integrated into a compact system whose major mechanical limits is dictated by the size of the sensors and processing electronics and their interconnectivity; moreover, targeted applications only need data capture from the aforementioned image sensors, i.e. excluding the usage of any additional sensor such as distance sensor, etc.

ii) scalability of the system; various incarnations of the camera are envisioned, and the design must be scalable by construction;

iii) individual cameras with low (or limited) resolution; a panoptic camera consisting of a large number of image sensors, each with low resolution is the favored design, in contrast with a solution consisting of few high-resolution image sensors;

iv) real-time operation is a necessity in the image capture stage as well as in an embedded early image processing stage.

As an optical system, the panoptic camera has two distinguishable features:

first it is an omnidirectional camera, in the sense that it is able to record light information coming from any direction around its center.

second it is a polydyoptric system: each CMOS facet is a tiny camera with a distinct focal plane; hence the whole system is a multiple aperture camera. The layering of CMOS imagers is designed such that the field of view of each facet overlaps with that of its neighbors. An omnidirectional polydyoptric camera is ideal for certain inverse vision problems like ego-motion estimation or structure from motion, as proved in reference [8]. The ego-motion refers to estimating a camera's motion relative to rigidly placed objects in a scene; and the structure from motion refers to the process of finding the three dimensional structure by analyzing the motion of an object over time.

Moreover, because of the overlapping fields of view of each aperture facet, the panoptic system is also a plenoptic camera, see reference [8]. A novel approach for creating a panoptic camera by embedding commercial CMOS image sensors inside a hemispherical structure is presented. A panoptic camera contains, for example, 104 commercial CMOS image sensors and the FPGA based development platform designed to support its applications. Other generation of the panoptic system is to include i) custom, ASIC imagers designed with integrated intra and inter imager signal processing features, ii) integrated signal processing ASIC cores dedicated for omnidirectional imaging and its applications.

The reconstructed image field can be arbitrarily chosen to mimic virtual zoom, pan and tilt functions as long as there is data collected in the chosen direction, with an arbitrary viewing angle. As such, the system acts as a virtual camera. The effective resolution of the reconstructed image can also be modulated, since the number of acquired pixels in each direction is significantly larger than those acquired by a single camera, due to overlapping fields of view. This enables very high resolution imaging, and/or very large virtual zoom range.

The system possesses built in fault tolerance in the case of one (or multiple) sensors becoming non-operational. The overall system and the algorithms continue to reconstruct the omnidirectional image field using the acquired data coming from the remaining sensor elements. In a system consisting of large number of sensors, the effects of one sensor failing would be imperceptible. Intertwining two subsets of sensors with different optical/electronic capabilities allows synthesizing a virtual camera/sensor with new properties. For example, one can use two subsets of cameras programmed with two distinct gain controls, one for low light and one for high light intensities. In that case, a High Dynamic Range virtual camera can be synthesized. Likewise, subsets of cameras can be programmed with interleaved frame synchronization triggers, i.e cameras are purposefully not synchronized, so that the reconstructed video has a higher frame rate than any of the individual imagers. The same operational principle applies to intertwining subsets of sensors detecting different wavelengths.

A panoptic camera is built by positioning multiples of any type of camera on any curved surface such that a) all the surrounding environment of the curvature surface is covered by the total angle of view of the positioned cameras, b) at least the positioned neighboring cameras have overlapping fields of views and c) the individual imagers have distinct focal planes. The image sensor may be sensitive to any range of optical wavelengths.

Figure 1A:
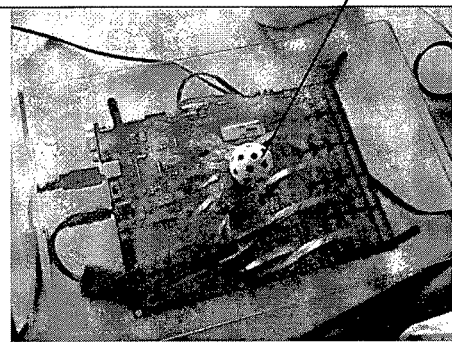
FIGS. 1a to 1c illustrate examples of a camera system according to the present invention.
Figure 1B:
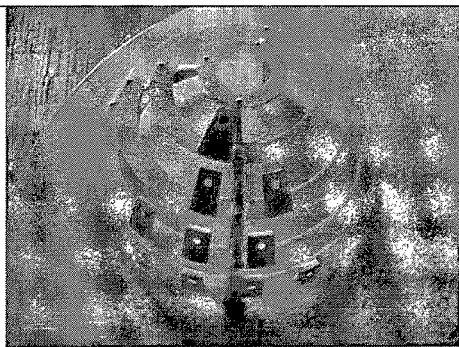
Figure 1C:
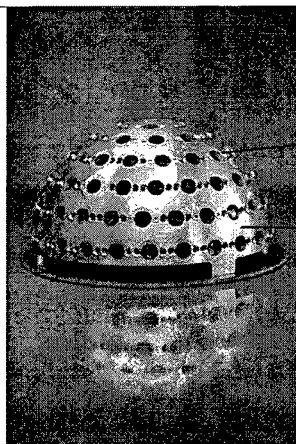

Examples of such structures are illustrated in FIGS. 1(*a*) to 1(*c*), 5(*a*), 5(*b*), 6(*a*) and 6(*b*) of the present application where FIG. 1(*a*) illustrates a ping-pong size camera, FIG. 1(*b*) a football size camera, and FIG. 1(*c*) an orange size camera.

Any type of camera and any type of curved surface can be used as long as the three aforementioned criteria's hold. The minimum number of cameras required to construct the panoptic camera is the minimum number camera that satisfy the aforementioned conditions. Using conventional angle of view of 60 degrees for each sensor, a typical minimum number would be 15 to cover the entire hemisphere. Other examples with 40, 49, and 104 sensors (cameras) have also been constructed and demonstrated.

The preferred choice for the curvature surface is a spherical or hemispherical structure. Scalability for the panoptic camera is achieved by changing the size of the radius of the spherical structure.

As a first embodiment, the panoptic system can be realized using an array of cameras positioned on a solid frame. Predefined camera positions on the spherical surface are first drilled out. The cameras are then positioned from inside the spherical structure. The cameras can hold to their positions inside the sphere by means of special designed holders, holders with screws or glue or any special mean which can hold the camera still in their position. As an example, FIGS. 1(*a*), 6(*a*) and 6(*b*) show a metallic support 10 forming such a spherical structure with holes 11 drilled out at predefined positions to allow placement of the cameras 12.

The Panoptic camera can be built in different sizes targeting different applications and means. A ping pong ball panoptic camera (FIG. 1(*a*)) is a structure of a ping-pong ball size that has all the features of a panoptic camera with a wireless connectivity. The system dimensions can also be scaled up to several tens of centimeters or even meters, depending on the surface that needs to be covered. All of the fundamental properties of the system remain unchanged, and are independent of the system dimensions/surface shape.

The imaging system that captures light rays from all directions simultaneously can be fabricated as a flexible structure, that is bent to form a shape that guarantees the presence of a certain angle between the image sensors. In this system, each image sensor is fabricated as an array of pixels, also encompassing the optical system. A flexible substrate, for example made of parylene, forms the base on which individual imagers are fixed. The electrical connections to carry power and data between the integrated imagers consist of conductive metal lines embedded into the parylene substrate, as a sandwich architecture. The flexibility of the parylene enables bending the system into an approximation of a circular or semi-circular shape or any other desirable shape.

In another embodiment, the panoptic system can be made of any media which is flexible and has the capability to integrate or embed electronics.

Each imager integrated circuit used in the construction of the omnidirectional system embeds an array of photodiodes. Each imager also embeds local processing capability, which takes the form of analog processing at the pixel level, as well as digital processing at the level of the imager.

The system relies on a perfect knowledge of the geometry of the structure.

Therefore there is a need to calibrate the system before its first use. A generic panoptic system comprising sensors layered on a curved surface must be calibrated to be used properly. Herein we refer to calibration as a way to estimate the parameters of each sensor (internal camera model parameters for example) but also as a way to estimate the global parameters of the array (positioning and direction of the optical axes of the sensors in 3D space). These parameters can be fixed by high precision design but for cost effective implementations they can also be estimated at run time for imprecise designs.

The internal parameters of each imager or sensor are calibrated by traditional single sensor algorithms. A procedure for calibrating the entire array is now detailed. Due to the camera configuration, it is not possible to calibrate the system at one time, since only neighbor cameras have overlapping field of view. Pairs of cameras sharing a partial field of view are thus calibrated and then this information is propagated through the system. This is achieved by having few cameras observing the same checkerboard. Then, using correspondences between corners of the chessboard, the change of coordinates between the coordinate system of the checkerboard (X and Y vectors being in the checkerboard plane and Z perpendicular to it) and the coordinate system of the camera is computed. After this step, the orientation of the pointing direction (to vector), of the vertical direction (up vector) and of the origin of the camera 2 (from vector) in the 3-D space can be known in the coordinate system of camera 1. This operation is repeated for all pairs of cameras by moving the checkerboard (or rotating the panoptic system).

Finally, we fix the coordinate system of reference to be that of one camera, e.g. the North pole camera in a spherical design. Then, given all the computed coordinate changes, the information of this reference camera is "propagated" to all the other cameras by the neighbor relationship, i.e. camera 1 is the neighbor of camera 2 if they observe the same checkerboard. This defines actually a graph structure between cameras that enforce the global consistency of the set of parameters.

The panoptic camera is a plenoptic camera. The arrangement of the cameras on a curved surface, their distinct focal point and the high resolution of each of the camera allows a stable interpolation of an omnidirectional view in any point in the interior of the surface. The polydioptricity of the device, i.e. the fact that it observes the surrounding 3-D scene by a set of camera with disjoint focal points, can be interpreted as a position-direction sampling of the underlying plenoptic function. The system thus allows to measure the light field within a bounded volume using various procedures which we now describe.

Figure 2:
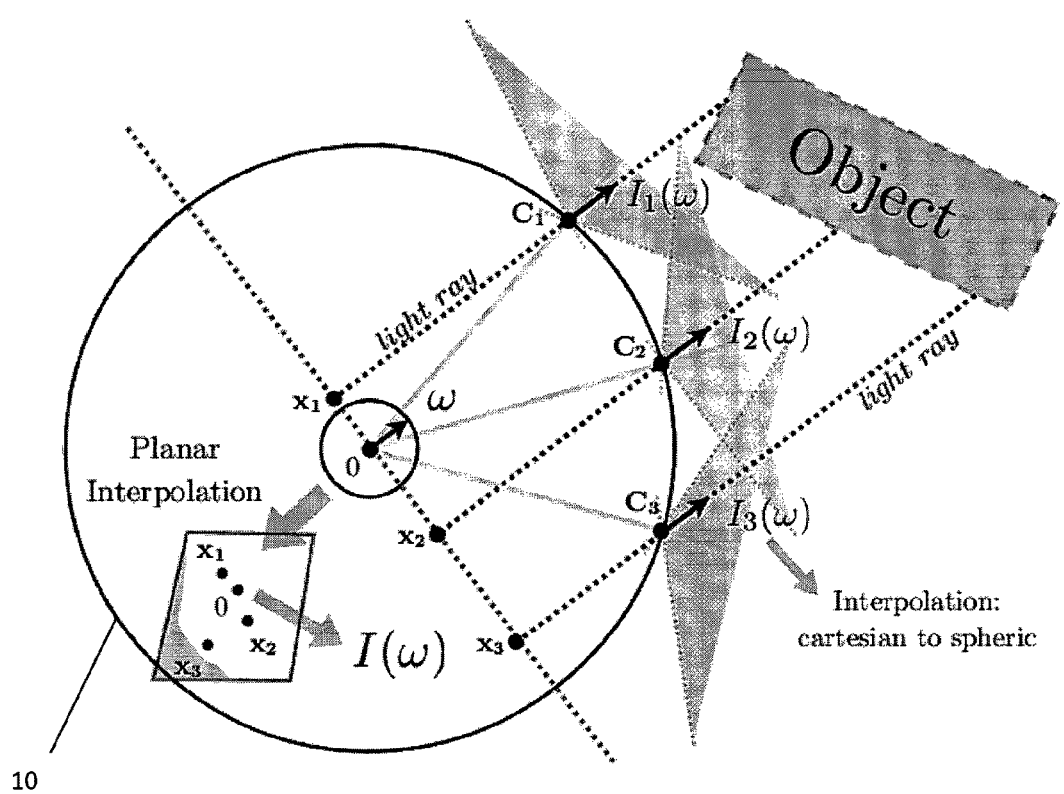
FIG. 2 illustrates the interpolation of a plenoptic function in a direction ω.

With reference to FIG. 2 the interpolation of the plenoptic function in a direction $\omega$ can be obtained by any regression method in the orthogonal plane, from the plenoptic samples $I_i$ collected from camera $C_i$ having $\omega$ in their field of view. Light rays parallel to the fixed direction $\omega_j$ and that are incident to pixels recorded by the set of sensors are represented by their intersection with the plane orthogonal to $\omega$ $x1$, $x2$ and $x3$ In that plane, this set of samples is used to regress the intensity of missing light rays hence allowing to measure the full light field collinear with $\omega$. The operation can be repeated by varying $\omega_j$ for all directions compatible with the geometry of the array. The set of regressed light rays forms a complete estimate of the omnidirectional light field incoming to the system.

$C_1$, $C_2$ and $C_3$ are the camera center locations. $I_1(\omega)$, $I_2(\omega)$ and $I_3(\omega)$ are the intensity functions observed at the corresponding $C_1$, $C_2$, and $C_3$ positions. The $x_1$, $x_2$ and $x_3$ are the projections of the camera center positions $C_1$, $C_2$, $C_3$ onto the orthographic plane, shown as a grey dotted line cutting the circle into half. O represents the center of the hemisphere.

Figure 3:
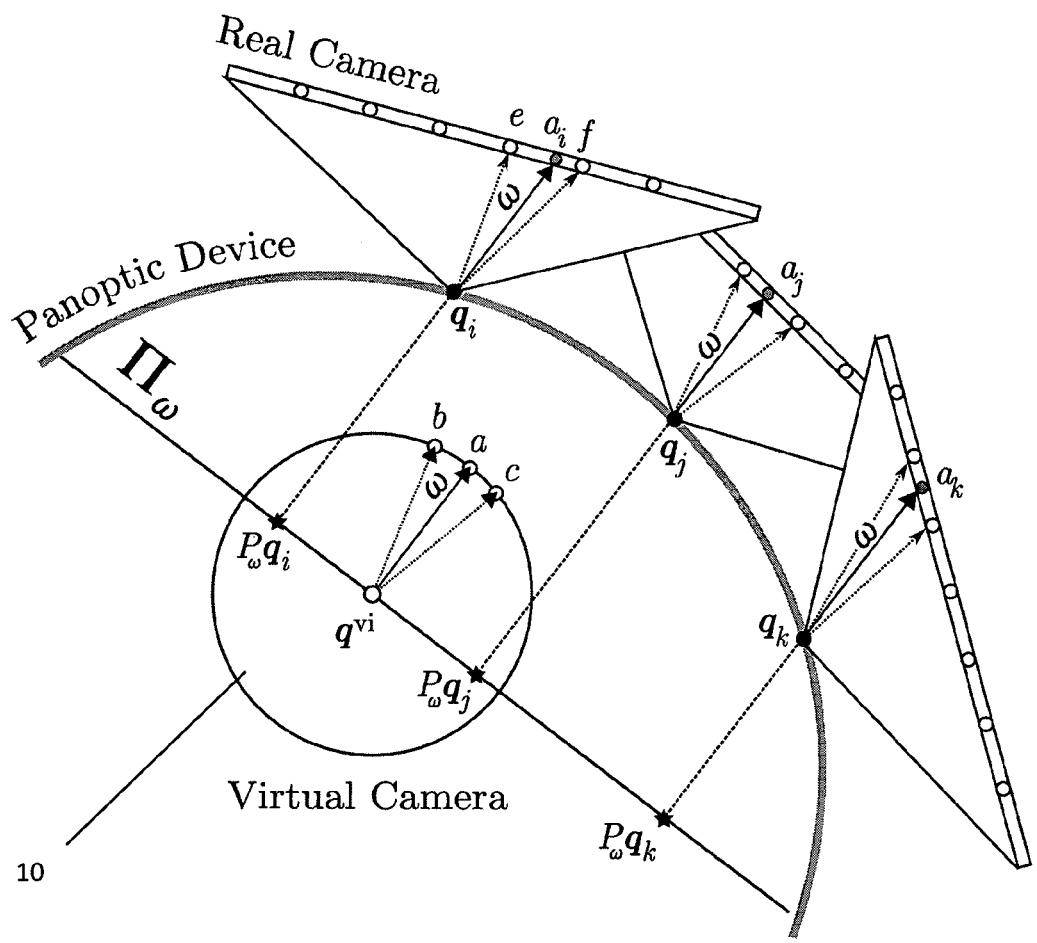
FIG. 3 illustrates a panoptic graph.

Simple regression methods include nearest neighbor interpolation, interpolation of any order or other known regression techniques. However we describe now a specialized procedure, see FIG. 3. A weighted undirected graph is constructed based on the sensed pixels only. A first set of vertices of this graph represent light rays, parameterized by incident direction and the position of their intersection with the plane orthogonal to the incident direction. A second set of vertices represents the pixels acquired by the various imagers. Vertices are linked by edges with weights measuring their proximity. The proximity between light rays is measured by the distance between their incident direction. The proximity between pixels is measured by the distance on the imager plane. There also exist edges between vertices of the two sets: a light ray incoming to a given pixel is linked to that pixel. This panoptic graph allows us to regress the intensity of the full light field from the knowledge of the pixel intensities only by regression on the graph. Regression propagates the information from the pixels to the light rays through the connections of the graph. Any regression technique on weighted graphs can be used.

The image formation mechanism can be restricted to a small field of view by simply evaluating a reduced subset of incident directions. Moreover the sampling density of incoming light rays regressed by the system can be user defined. By restricting the field of view and increasing the sampling density, the system produces a digital zooming effect.

Since the panoptic camera is a polydioptric array it gives access to parallax information that can be used to compute the depth of points in the scene in all directions spanned by the system. The Panoptic system thus produces both texture images and depth maps that are omnidirectional or restricted to a user defined direction and field of view.

The estimation of depth in the panoptic system can be achieved by applying dense disparity estimation algorithms to pairs of acquired images with overlapping fields of views. The calibration parameters of the array are then used to fuse the pairwise depth maps into a single omnidirectional depth map. Depth can also be computed from the estimation of the light field intensity performed by the system. Indeed, in a spherical design, the intensity gradient with respect to the viewing direction and the intensity gradient in the plane orthogonal to the viewing direction are linearly proportional. That proportion is the depth of the scene in the viewing direction. The depth map is estimated by a penalized regression from the digital gradients to overcome the effects of noise and mis-estimation of the light field. The penalty enforces the piecewise smooth nature of the expected depth map by assuming the form of a Total Variation constraint.

When a dense depth map is not necessary, feature points based disparity maps can be computed with any standard method between pairs of images with overlapping fields of views.

The panoptic device is constructed as an interconnected network of cameras, each with its local image processing capability. The underlying network facilitates the data communications among the cameras and the cameras to a central unit. In an interconnected network scheme for the panoptic device, each camera acts as a source terminal and a switching node. As a source terminal each camera injects its own generated data to the network and as a switch it routes its own data and other data coming from other entities (i.e. other cameras or the central unit) to other entities on the device.

The network topology for the cameras is selected based on the available resources to achieve as much connections among neighboring cameras and minimum hop count (distance) from the cameras to a common central unit. Other networks basics are applied to the interconnection network of panoptic device such as routing (oblivious, adaptive or a combination of two) and flow mechanism.

The panoptic device conducts signal processing at three levels:
a) At the pixel level within a single camera. This level is referred as intra signal processing.
b) Among the cameras. This level is referred as the inter signal processing.
c) Central unit. The network of imager nodes consists of highly interconnected imagers, each capturing significant amounts of data, as well a local processing in the form of data compression, image and video processing on-chip and depending on the application.

Information processing is carried out in two distinctive locations. First, information is processed locally, using the processing capability of each individual node (case a). Second, groups of nodes are formed (handling case b), one of which is physically connected to a central processing using, which is implemented as an ASIC or FPGA (handling case c). The central unit performs the final steps of data processing. The central unit is also in charge of monitoring the network status in real time, and performs adaptation of the network topology. In case one node becomes inoperative, the network topology needs to be adapted; depending on the application, different imager constellations are used to extract information from the scene, and packet have to be rerouted. Thus, quality of service is guaranteed. Moreover, the central unit is also in charge of adapting the size of network clusters of imagers, depending on the computational load requested by the application, and the physical layer of the network.

This network of nodes, each with local processing ability is equipped with dynamic load balancing. Computational load can be shared among nodes in the network enabling to avoid computational saturation of specific nodes. Applications which are sensitive to a specific portion of the space require high computational capabilities from the nodes which are sensing into the specific direction of interest. Image and video processing of the stream is dynamically shared with nodes which have less computational load.

In addition to the standard features of a camera, each camera of the panoptic device holds two additional features:
a) Integration within a network and
b) intra and inter signal processing.

Intra and inter signal processing for the cameras permits local, distributed and parallel implementation of a desired application of a panoptic device. Load balancing in terms of processing power can be conducted among the cameras and the central unit.

Local signal processing features, i.e. at the camera level both intra and inter signal processing, could be global defined and programmable and can be leveraged by user's demands for any desired application. Some local signal processing is dedicated for a specific application.

The panoptic device can also be constructed using any type of FPGAs, cameras and external memory components. The choice of FPGA, cameras and external memory depends on the resource and performance requirements of the desired panoptic device and its supporting applications. FPGAs can be arranged in a) an interconnected network assembly each hosting a single or multiple cameras emulating the interconnected networks of cameras for the target panoptic device or b) in a concentrator and central hierarchical combination where a number of FPGAs interface with the cameras (referred to as concentrator FPGAs) and other FPGA acts as the central unit for concentrator FPGAs.

In both scenarios, the FPGAs are deployed with a combination of network related, packet switching, parallel and distributed signal processing, image processing, single/multiple processing cores and high speed I/O interfaces/links for communication among the FPGA and the external world. Scalability features can also be considered for both scenarios to have a scalable panoptic device in terms of number of embedding cameras.

Figure 4:
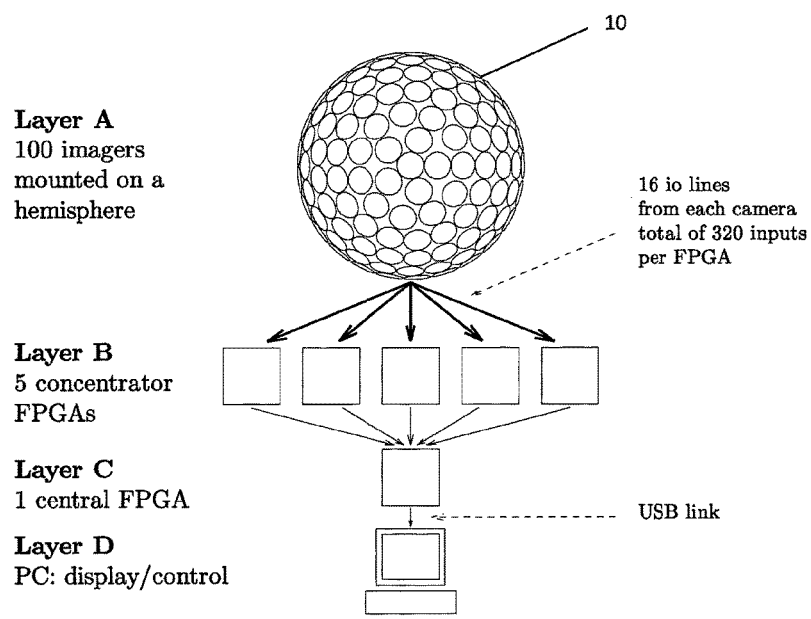
FIG. 4 illustrates an architecture of the system according to the invention.

FIG. 4 illustrates a possible embodiment of a hardware system with a layer A which comprises the camera mounted on a hemisphere as described above. Typically, this layer may contain 100 cameras/imagers.

The layer B comprises a first set of concentrators, for example 5 concentrator FPGA which are connected each to 20 cameras by 16 i/o lines, which makes a total of 320 lines per FPGA.

The Layer C comprises one central FPGA and the layer D a PC display/control connected for example via a USB link.

Standard display outputs can also be considered for the panoptic device such as VGA, DVI and HDMI.

The physical realization of the omnidirectional image sensor comprises the layering of CMOS imagers on the surface of a hemisphere such that each imagers points into a determined and distinct direction, see FIGS. 5(a) and 5(b). The location of each CMOS imager on the surface of a hemisphere follows a general coverage method of the hemisphere surface with area constant circular faces, each representing the area occupied by one camera, its package and embedded connectivity. The hemispherical surface of a unit sphere is divided into N+1 latitude floors. All circular faces located on a floor have the same latitude angle. The top most floor located on the north pole of the hemisphere only contains one circular face. The latitude angle θn of the nth floor is obtained from:

$$\theta_n = 2n\alpha \quad (1)$$

where α is the radius of the circular face on the unit sphere, which is obtained from (2) for a hemisphere with N+1 latitude floors.

$$\alpha 0 = \frac{\Pi}{2(2N+1)} \quad (2)$$

The centers of the neighboring circular faces located on each latitude floor are positioned with $\Delta\varphi n$ longitudinal angle difference with respect to each other. In order to accommodate the maximum number of faces on each latitude floor and avoid boundary crossings of the circular faces, the $\Delta\varphi_n$ should be calculated from (3) for each latitude floor.

$$\Delta\varphi_n = 2\arccos\frac{\sqrt{\cos^2\alpha - \cos^2\theta_n}}{\sin\theta_n} \quad (3)$$

As an example FIGS. 5(a) and (b) depicts the hemispherical structure with 7 floors (i.e. N=6). The 7 floors hemispherical structure contains 104 circular faces. A panoptic camera prototype was built using a classical digital machining of an aluminum structure, and polyvinyl chloride (PVC) camera holders. The location of the cameras is based on the circular positions of the hemisphere structure shown in FIGS. 5(a) and (b). The fabricated panoptic camera is shown in FIGS. 6(a) and (b) illustrating a support 10 with holes 11 and cameras 12. The diameter of the hemisphere 10 is for example 129 mm. The fabricated hemisphere structure 10 is placed for example over a circular printed circuit board which provides access to embedded imagers through flexible wire connections (see the principle illustrated in FIG. 1(a)).

Panoptic Camera Analysis

An omnidirectional view can be obtained by projecting light rays onto a spherical or hemispherical image sensor. Currently available silicon fabrication technologies do not enable the systematic placement of photodiodes over a spherical structure. The panoptic camera is used to emulate an omnidirectional view seen by a hemispherical image sensor. The construction of an omnidirectional view using the panoptic camera requires that all the field of views of the cameras 12 positioned on the hemispherical structure 10 cover the surrounding environment of the hemisphere. The full view coverage distance of the panoptic device expresses the minimal distance which enables the panoptic device to sample a fully covered omnidirectional view. For the case of an ideal hemispherical image sensor, the distance with respect to the center of the hemispherical structure 10 which enables full-view coverage occurs is equal to the radius of the hemispherical structure itself. By contrast to the ideal case, the distance which the full view coverage is reached for the panoptic device is not equal to the radius of the hemispherical structure. The full view coverage distance depends on the number of cameras 12 positioned on the hemisphere, the position of the cameras 12 on the hemisphere 10, and the angle of view of each camera 12. The full-view coverage distance is a fundamental boundary condition for the optimal use of the multi-aperture panoptic camera, and its rigorous derivation is presented in the following.

A. Panoptic Camera Voronoi Diagram (FIG. 8(a) which Illustrates a Side View of the Voronoi Diagram of the Pixelized Hemispherical Structure with Seven Floors and 8(b) which Illustrates a Top View of the Voronoi Diagram of the Same Structure of FIG. 8(a))

The construction of the omnidirectional vision observed by a spherical image sensor is feasible through point sampling of the image sensor surface. The sampling of the surface of a sphere is referred to as the pixelization of the sphere surface. The sample surface points of the sphere are referred as pixels. FIG. 7 shows an example of a pixelized sphere surface with Nθ pixels for its latitude and Nφ pixels for its longitude. In this example, the number of pixel is 32 in each direction (latitude and longitude). The direction of each pixel in the omnidirectional view is identified by vector $\vec{\omega}$. Hence each pixel resembles the light intensity observed by the spherical image sensor in direction $\vec{\omega}$. The surface of an ideal spherical image sensor is covered with pixels such that all the possible $\vec{\omega}$ directions are observable by the sphere.

To emulate an ideal hemispherical image sensor with the panoptic device, each pixel position of the spherical image sensor must be observable by at least one camera 12 of the panoptic device. To guarantee this criteria, the surface of the panoptic device hemisphere 10 must be partitioned such, that in each partition there would be only one camera position which is closest to all the residing surface points (i.e. pixels) inside that partition. Hence each pixel on the hemisphere surface is extracted from the camera 12 residing in its respective partition. The partitioning of the surface of the hemisphere with respect to the camera positions falls into the category of a well established geometry concept known as Voronoi diagram, see reference [9] or Voronoi tessellation.

The objective of the Voronoi diagram is to find the Voronoi cell of each Voronoi site. In the simplest case, the Voronoi sites are a set of points on a planar surface. The Voronoi cell of each site consists of all points closer to itself than any other site. The segments of the Voronoi diagram are all the points that are equidistant to the two nearest sites. The Voronoi nodes are the points in the plane that are equidistant to three or more sites. In general, the Voronoi diagram is extendable to any number of dimensions and standard algorithms exist for generating a Voronoi diagram, see reference [10].

The concept of Voronoi diagram is applied to the panoptic device hemisphere surface partitioning, assuming the center position of the cameras 12 as the Voronoi sites and the Voronoi cells residing on the hemispherical surface, and all the cameras 12 having the same angle of views. This is illustrated in FIG. 8(a) showing a side view of the Voronoi diagram of a pixelized hemispherical structure with seven floors and 8(b) which shows the top view of the Voronoi diagram of the structure of FIG. 8(a).

Each point (i.e. pixel) in a Voronoi cell has a distance with respect to its Voronoi site (i.e. camera 12 position). The farthest covering point (i.e. pixel) of a Voronoi cell with respect to its corresponding Voronoi site (i.e. camera position) is of interest. The latter point (i.e. pixel) for each Voronoi cell is the last point that is covered by its respective Voronoi site (i.e. camera position). The farthest point in each Voronoi cell with respect to its Voronoi site is also a Voronoi node.

By finding the Voronoi cell which its farthest covering point has the maximum distance among all the Voronoi cells with respect to its Voronoi site, the overall last covering point (i.e. pixel) and its Voronoi site (i.e. camera position) that covers it, is obtained for the hemisphere of the panoptic device. The last covering point (i.e. pixel) of the hemisphere of the panoptic device is denoted as $\omega_{LCP}$.

To provide an illustrative insight for applying the Voronoi diagram concept to the panoptic device hemispherical structure, the Voronoi diagram of the hemisphere structure of FIG. 5(a) is depicted in FIGS. 8(a) and (b). Each Voronoi cell which has the form of a convex polygon encompasses a Voronoi site (i.e. the camera center position) of its cell. The Voronoi nodes are indicated on the vertex of Voronoi cells with circles in FIGS. 8(a) and (b). The segments of the Voronoi cell which contains the last covering point are shown with bold lines in FIG. 8(b). The last covering point (i.e. $\omega_{LCP}$) is highlighted with a bold circle in FIG. 8(b). FIGS. 8(a) and (b) reveal that Voronoi sites positioning provided by equations (1), (2) and (3) does not yield a symmetric Voronoi diagram with identical Voronoi cells. In general a symmetric Voronoi diagram on a spherical surface is not achievable, see reference [10]. Nonetheless positioning schemes exist which yield a close to symmetry Voronoi diagram for a spherical surface.

The positioning scheme by equations (1), (2) and (3) is preferred considering constraints related to the mechanical construction of the panoptic device.

B. Conic Field of View and Coverage Distance (FIG. 9(a) which Illustrates Cameras with a Conic Field of View on the Panoptic Device, for the Sake of Clarity Only Five Cameras are Modeled in this Figure and 9(b) which Illustrates the Intersection of the Conic Field of View Boundary and the Spherical Surface of Radius R)

The construction of an omnidirectional scene utilizing the panoptic device of the present invention requires that each pixel of the omnidirectional scene be observed by at least one of the cameras 12 of the panoptic device. Hence all the pixel points of the omnidirectional scene must lie in the field of view of at least one camera 12 of the panoptic device. Any pixel on the spherical surface 10 is constructible starting from a specific distance with respect to its observing camera position. To obtain the latter distance, it is required that the field of view of the cameras 12 be modeled.

A camera model in its simple form and ideal case is a pinhole model camera (see reference [11]) with conical field of view. Assuming the ideal model for each camera positioned on the panoptic device as shown in an example in FIG. 9(a), a closed form solution is obtained for the distance at which a point on the spherical scene is observed by a camera. In FIG. 9(a) the conic field of views of the cameras 12 are only shown for the top camera positions of the panoptic device.

The distance at which a point of interest for spherical vision construction is observed by a camera 12 of the panoptic device is obtained by solving the problem for a normalized hemisphere structure and a single camera 12 positioned on the north pole of the structure. The obtained solution is generalizable for any hemispherical structure of any size by a scale factor, and, due to symmetry of the hemisphere structure to any position of the cameras 12 located on the panoptic device 10.

A hemisphere structure with a normalized radius (i.e. r=1) is depicted in FIG. 9(b). Position c in FIG. 9(b) depicts the center position of the camera 12 located on the north pole of the normalized hemisphere structure. A typical point of interest to be observed for the spherical scene construction is shown at position ω, on the surface of the hemispherical structure. The ω point is positioned with an angle latitude difference of β with respect to the camera center point c. The boundary of the conic field of view of the north pole camera 12 is depicted in FIG. 9(b) with an opening angle of α. The distance at which the point ω is observed in the field of view of the camera centered at position c is obtained by finding the radial distance R which passes through the ω point and intersects the conic field of view of the north pole camera 12. The sphere with radius R is co-centric with the normalized sphere of the panoptic device. The center of the two spheres are indicated by 0 in FIG. 9(b).

In mathematical terms, the radial distance R is obtained by solving the intersection equation of the conic surface with an opening angle of α and the spherical surface with radius R.

$$\begin{cases} \dfrac{x^2+y^2}{\tan^2\left(\dfrac{\alpha}{2}\right)} = (z-1)^2 \\ x^2+y^2+z^2 = R^2 \end{cases} \quad (4)$$

Solving (4) yields:

$$z = \sin^2\left(\frac{\alpha}{2}\right) + \cos\left(\frac{\alpha}{2}\right)\sqrt{R^2 - \sin^2\left(\frac{\alpha}{2}\right)} \quad (5)$$

The relation between the azimuth angle $\beta$ and $R$ is expressed in (6)

$$\beta = \arccos\left(\frac{z}{R}\right) \quad (6)$$

The following relation is obtained for the azimuth angle $\beta$ with respect to the camera angle of view $\alpha$ and the distance $R$.

$$\beta = \arccos\left(\frac{\sin^2\left(\frac{\alpha}{2}\right) + \cos\left(\frac{\alpha}{2}\right)\sqrt{R^2 - \sin2\left(\frac{\alpha}{2}\right)}}{R}\right) \quad (7)$$

Rewriting (7) so that the distance $R$ is defined with respect to $\beta$ and $\alpha$, the following equation is derived:

$$R = \frac{\sin\left(\frac{\alpha}{2}\right)\sin\left(\frac{\alpha}{2} + \beta\right)}{\cos^2\beta - \cos^2\frac{\alpha}{2}} \quad (8)$$

An important observation is made if distance $R$ tends to infinity in expression (7).

$$\lim_{R \to \infty} \beta = \frac{\alpha}{2} \quad (9)$$

The value of $\beta$ tends to $$\frac{\alpha}{2}.$$

Hence, a point of interest for the spherical scene construction can only be seen by a camera if the angle between the radial vector of its position and that of the center position of the target camera is less than half of the opening angle of view of the camera.

C. Panoptic Camera Full-View Coverage Distance (FIG. 10(a) which Illustrates the Minimum Angle of View for the Cameras of the Panoptic Device with N+1 Latitude Floors and 10(b) which Illustrates the Normalized Full Coverage Distance Vs Angle of View of the Panoptic Device, the Normalizing Factor being the Unit Sphere Radius).

The last covering point (i.e. $\omega_{LCP}$) for the spherical scene construction of the panoptic device and the camera 12 that observes it is obtained through the Voronoi diagram of the panoptic device. The minimum required angle of view for a panoptic device is obtained by finding the angle between the last covering point positioning vector and the positioning vector of the camera that observes it. This angle is denoted $\beta_{max}$. Using (9), the minimum angle of view is obtained by (10).

$$\alpha_{min} = 2\beta_{max} \quad (10)$$

TABLE I

LAST COVERAGE POINT AND MINIMUM ANGLE OF VIEW FOR FULL COVERAGE OF A PANOPTIC DEVICE WITH N + 1 LATITUDE FLOORS

| N | C | $\omega_{LCP}$ | $\beta_{max}$ | $\alpha_{min}$ |
|---|---|---|---|---|
| 1 | (0.27, 0.82, 0.50) | (0.81, 0.59, 0.00) | 46° | 92° |
| 2 | (−0.48, 0.35, 0.81) | (−0.77, 0.00, 0.64) | 28° | 56° |
| 3 | (0.55, −0.80, 0.22) | (0.35, −0.93, 0.00) | 19° | 38° |
| 4 | (−0.28, 0.20, 0.94) | (−0.45, 0.00, 0.89) | 16° | 32° |
| 5 | (−0.23, −0.17, 0.96) | (−0.37, 0.00, 0.93) | 13° | 26° |
| 6 | (−0.19, 0.14, 0.97) | (−0.32, 0.00, 0.95) | 11° | 22° |
| 7 | (0.06, 0.20, 0.98) | (−0.08, 0.26, 0.96) | 9.5° | 19° |
| 8 | (0.06, 0.17, 0.98) | (−0.07, 0.23, 0.97) | 8.5° | 17° |
| 9 | (0.05, 0.16, 0.99) | (−0.07, 0.20, 0.98) | 7.5° | 15° |
| 10 | (0.05, 0.14, 0.99) | (−0.06, 0.19, 0.98) | 7° | 14° |

FIG. 10(a) illustrates the minimum angle of view for the cameras 12 of the panoptic device with N+1 latitude floors, and FIG. 10(b) illustrates the normalized full coverage distance vs angle of view of the panoptic device. The normalizing factor is the unit sphere radius.

Choosing $\alpha > \alpha_{min}$ as the angle of view for the cameras of the panoptic device and assuming that all the cameras are identical, the normalized full-view coverage distance of the panoptic device is obtained utilizing (8) through (11).

$$R_{FCD} = \frac{\sin\left(\frac{\alpha}{2}\right)\sin\left(\frac{\alpha}{2} + \beta_{max}\right)}{\cos^2\beta_{max} - \cos^2\left(\frac{\alpha}{2}\right)} \quad (11)$$

The last column in Table I, named $\alpha_{min}$, contains the calculated value of the minimum required angle of view for the cameras 12 of the panoptic device with N+1 latitude floors and a normalized radius (i.e. r=1). The second and third columns of Table I include the positions of the cameras 12 for the observation of the last covering points and the last covering points positions respectively. And the forth column of the Table I holds the value of $\beta_{max}$ for each panoptic device of N+1 latitude floors.

The minimum angle of view required for full coverage versus the number of latitude floors is presented in FIG. 10(a). As the number of latitude floors increase, which is equivalent to increase in number of cameras of the panoptic device, the minimum required angle of view for full-view coverage decreases (FIG. 10(a)). A trade-off is observed between the minimum required angle of view and the number of cameras positioned on the panoptic device. Hence a panoptic device with less number of cameras 12 requires a larger angle of view for its cameras in order to achieve full view coverage and conversely.

The full-view coverage distance (i.e. $R_{FCD}$) for several panoptic devices with N+1 latitude floors versus the angle of view of the cameras 12 are depicted in FIG. 10(b). As the number of latitude floors increase and hence the number of cameras, identical full-view coverage distance is reached at smaller angle of views. A similar trend is observed for all panoptic devices, as the angle of view of their cameras increase their full-view coverage distance decrease.

The minimum full-view coverage is obtained if cameras 12 with fish-eye angle of view are selected (i.e. $\alpha=180°$). Thus replacing $\alpha=180°$ in (11) the minimum achievable full coverage view distance is:

$$RFCD\min = \frac{1}{\cos\beta\max} \qquad (12)$$

In this Section, a systematic approach has been presented for the analysis of the panoptic device omnidirectional view construction boundaries. Although the approach has only been demonstrated for a panoptic device with the specific camera positioning scheme defined by (1), (2) and (3), the presented method is equally applicable to other camera positioning schemes and any number of cameras 12 as well.

[IV. Omnidirectional Vision Construction]

The natural application of the panoptic camera consists of omnidirectional vision construction. The organization of the imagers over the hemispherical structure 10 enables the emulation of an omnidirectional view, i.e., the representation of all light ray intensity crossing (i.e. all $\vec{\omega}$ directions) the hemisphere origin on the sphere of directions. The sphere of directions is identical to the sphere of the panoptic device. The surface of this sphere is pixelized with $N_\theta$ pixels for its latitude and $N_\varphi$ pixels for its longitude. An example of a pixelized sphere surface with 32 pixels for $N_\varphi$ and $N_\theta$ has been shown in FIG. 7. The direction of each pixel in the omnidirectional view is identified by vector $\vec{\omega}$.

The construction of the omnidirectional image for each omnidirectional pixel in direction $\vec{\omega}$ is performed in two algorithmic steps.

Firstly, all cameras 12 participating to the reconstruction, i.e. having $\vec{\omega}$ in their field of views, are determined. All these cameras 12 provide then (by interpolation) the intensity of what they observe in direction $\vec{\omega}$.

Secondly, another interpolation is performed in the space of light rays given by the direction $\vec{\omega}$ and passing through the camera origins. This provides the intensity of the light ray crossing the hemisphere origin, i.e. the virtual omnidirectional vision in $\vec{\omega}$. Notice that the center of the omnidirectional image does not need to coincide with the center of the hemisphere. It suffices to select the direction $\vec{\omega}$ accordingly. Importantly, this means the system can reconstruct several omnidirectional images centered around any position within the hemisphere supporting the cameras. An interesting application is the construction of stereo pairs of omnidirectional images.

FIG. 11(a) illustrates the radial and tangential vectors identifying the focus direction and the coordinates of the cameras image frame plane.

FIG. 11(b) illustrates a zoomed portion of the previous FIG. 11(a).

FIG. 12(a) illustrates the cameras 12 contributing to pixel position, (b) contributing positions on the image frame of the contributing cameras 12 to pixel position $\vec{\omega}$.

A. First Algorithmic Step (FIGS. 11(a) and (b))

Each camera 12 is identified by three unit vectors $\vec{t}$, $\vec{u}$, $\vec{v}$ and its center position on the panoptic device 10. The center position of the camera 12 is considered as the center position of the image frame of the camera 12. The radial vector $\vec{t}$ of each camera is used to identify the observation focus of the center position of each camera 12. The two unit vectors $\vec{u}$ and $\vec{v}$ are used to identify the coordinates of the image frame of each camera 12. The cameras 12 are positioned in a way that guarantees that all the $\vec{u}$ vectors and the $\vec{v}$ vectors become parallel with the unit tangential vectors of the spherical coordinates $-\vec{\theta}$ and $-\vec{\varphi}$ respectively. The radial and tangential vectors of each camera position of a panoptic device with 7 floors (i.e. N=6) are depicted in FIG. 13(a). A zoomed portion of FIG. 13(a) is shown in FIG. 13(b). The $\vec{u}$ vectors are facing upwards to the north pole for each camera and the $\vec{v}$ vectors are pointing in the counter-clockwise direction of the polar angle. Considering the aforementioned placement of the cameras on the hemisphere structure of the panoptic device, the three unit vectors of the ith camera are obtained from (13).

$$\begin{cases} \vec{ti} = \sin\vartheta i\cos\varphi i\vec{x} + \sin\vartheta i\sin\varphi i\vec{y} + \cos\vartheta i\vec{z} \\ \vec{ui} = \cos\vartheta i\sin\varphi i\vec{x} + \cos\vartheta i\cos\varphi i\vec{y} + \sin\vartheta i\vec{z} \\ \vec{vi} = \sin\varphi i\vec{x} + \cos\varphi i\vec{y} \end{cases} \qquad (13)$$

$\theta i$ and $\varphi i$ are the latitude and longitude positions of the ith camera center position. The latitude and longitude of each camera center position are derived from (1) and (3). Considering (9), to find out whether the pixel direction $\vec{\omega}$ falls in the field of view of the ith camera, it is sufficient to calculate the angle between the two $\vec{\omega}$ and $\vec{ti}$ unit vectors and check whether this angle is smaller than $$\frac{\alpha}{2},$$

where $\alpha$ is the angle of view of the camera. Another alternative consists of calculating the dot product of the two unit vectors $\vec{\omega}$ and $\vec{ti}$ as expressed in (14).

$$\omega ti = \vec{\omega} \cdot \vec{ti} \qquad (14)$$

If $\omega_{ti}$ is larger than $$\cos\left(\frac{\alpha}{2}\right),$$

the pixel direction $\vec{\omega}$ lies in the field of view of the ith camera.

FIG. 12(a) illustrates an example of selecting the contributing cameras 12 for a typical pixel direction $\vec{\omega}$ in a panoptic device 10. The edges of the contributing camera 12 faces are bold in FIG. 12(a). The number of contributing cameras is 17 in this example. FIGS. 12(a) and (b) will be used as a referring example in the continuation of this Section.

Having found the contributing cameras 12 for pixel direction $\vec{\omega}$, the next step consists of finding the contributing position of the contributing cameras 12 on the image frame. Using the pinhole camera model, see reference [11], the contributing two dimensional position $(xu_i, xv_i)$ on the ith camera image plane (which is identified by coordinate unit vectors $\vec{ui}$ and $\vec{vi}$) is expressed as:

$$xui = -\frac{\vec{\omega} \cdot \vec{ui}}{\vec{\omega} \cdot \vec{ti}} fL \quad (15)$$

$$xvi = -\frac{\vec{\omega} \cdot \vec{vi}}{\vec{\omega} \cdot \vec{ti}} fL$$

Where fL represents the camera focal length in (15). As an example, the contributing positions of an assumed dot on the image frame of the contributing cameras 12 in FIG. 12(a) are shown in FIG. 12(b) with bold mark points. The image frame planar arrays shown in FIG. 12(b) are fictitious and are only drawn for illustrative purposes, figuring the image sensor array. Considering the selected direction of observation $\vec{\omega}$, as depicted in FIG. 12(a), the contribution of each imager into this direction is found at different (xu,xv) coordinates locations, since the imagers are not aligned. For example, the contribution of imager A in FIG. 12(b) into the direction of observation $\vec{\omega}$ consists of pixel A$\omega$. frame, the intensity that these cameras observe in the latter direction is obtained. obtained image frame as the intensity observed by that camera in pixel direction $\vec{\omega}$ considered. In general, variety of more complex algorithms exist in this domain. Discussion of these techniques is beyond the scope of this study and the reader is referred to related literature reference [12] for more details.

B. Second Algorithmic Step

Having obtained the intensity of all the contributing cameras 12 in pixel direction $\vec{\omega}$, a second algorithmic step is required to acquire the final intensity for the virtual omnidirectional vision in $\vec{\omega}$.

FIG. 13. (a) illustrates the projection of the camera centers contributing in direction $\vec{\omega}$ onto the planar surface normal to $\vec{\omega}$ FIG. 13(b) illustrates another view point of the camera centers projection onto the planar surface normal to $\vec{\omega}$.

The light ray intensities observed by each contributing camera in direction $\vec{\omega}$ are assumed as sampled light intensities, as if they were sampled from a planar mirror surface normal to the unit vector $\vec{\omega}$. This planar surface is indicated as the $\vec{\omega}$ plane for the direction $\vec{\omega}$ in FIG. 13(a). For clarity FIG. 13(a) is redrawn with a change in point of view in FIG. 13(b). The $\vec{\omega}$ plane is assumed to pass through the center of the sphere, without loss of generality. The sphere center is marked by a bold point in FIGS. 13(a) and (b). A projection of the center of each contributing camera, in a direction parallel to $\vec{\omega}$, and onto the $\vec{\omega}$ plane is derived. The projected points of the contributing camera positions in $\vec{\omega}$ onto the $\vec{\omega}$ are highlighted by hollow points in FIGS. 13(a) and 13(b). Each projected camera position on the planar surface is assigned a height value equal to the light intensity value that it observes in direction $\vec{\omega}$ (FIG. 13(b)).

As an example, the camera 12 indicated as A in FIG. 12(b) contributes in direction $\vec{\omega}$. The contributing pixel position on the image frame of the camera A is denoted as A$\omega$ in FIG. 12(b). The projection of the camera A center position onto the $\vec{\omega}$ plane is indicated as $P_A$ in FIGS. 13(a) and (b). The position $P_A$ on the $\vec{\omega}$ plane is assigned the height value $I_A$ (FIG. 13(b)). The height value $I_A$ is the light intensity observed by the pixel position A$\omega$ of camera A image frame. The same process is applied to the sixteen other participating cameras 12.

For the seventeen intensity values (i.e. height) in this example, one can obtain or estimate the intensity value which is observed into direction $\vec{\omega}$ by the aggregate participating cameras 12 through a two-dimensional interpolation, i.e. using an algorithmic aggregate of the 17 intensity values, or a subset of them to extract one unique intensity value. An alternative solution rather than using interpolation consists of selecting the intensity of the nearest neighboring position to the spherical center $\vec{\omega}$ plane as the intensity observed by the spherical center itself. In our example, $\vec{\omega}$ points to a camera center, which reflects in the fact that the projected camera center coincides with the sphere center, and the corresponding intensity is selected. Complex interpolation techniques for the aforementioned purpose exist see reference [12] for more details.

In order to construct the spherical omnidirectional view scene, the intensity of the center of sphere in all $\vec{\omega}$ directions must be derived, following the two algorithmic step method presented hereabove.

The next two Sections focus on the introduction of the platform designed for the emulation of the panoptic camera and the implementation of the omnidirectional vision construction algorithm on this platform.

FIG. 14 (a) illustrates the architecture of the full hardware system and FIG. 14(b) the architecture of a concentrator FPGA and this is described in the following parts in more details.

V. FPGA Development Platform

The panoptic device is designed with the aim of preferably having its own custom ASIC imagers with integrated intra and inter imager signal processing features and integrated signal processing ASIC cores dedicated for omnidirectional imaging and its applications. As a priori for the aforementioned purpose, a hardware emulation platform has been designed and developed based on FPGAs for the practice of implementing, verifying and qualifying the panoptic device and its applications in a real-time environment, before moving toward an ASIC solution.

A FPGA based system which supports a panoptic camera 10 with up to 100 imagers generating 16 bit common intermediate format (i.e. CIF 352×288 pixels) images at 25 frame per second rate is devised. This system receives an aggregate bit rate of 3.8 Gb/s.

An embodiment has been carried out, focusing on the system level required hardware specifications in terms of image acquisition rate, data transmission bandwidths, image processing rate, memory bandwidth and capacity, required level of architectural parallelism, FPGA pin count, connectivity, which conducted to the development of a layered system architecture, shown in FIG. 14(a), similar to FIG. 4 described above.

The system comprises four layers,
 i) layer A: 100 imagers (for example cameras 12) with programmable resolution, up to CIF,
 ii) layer B: five concentrator FPGAs, handling local image processing over 20 imagers in parallel, each,
 iii) layer C: one central FPGA which processes the final omnidirectional image construction, based on data transmitted in parallel from the concentrators, iv) layer D: a PC is in charge of the applicative layer consisting of displaying the operation results transmitted from the central FPGA. The PC is not a mandatory block in the system which is autonomous; it is only used to display results in the prototype implementation. In the final application embedding the panoptic camera, real time display capability or data communication capabilities are used.

A. Concentrator FPGA

An example of FPGA board has been designed utilizing Xilinx Virtex5 XC5VLX50-1FF1153C as the concentrator FPGA module. Each concentrator FPGA board supports up to 20 imagers with 16 input/output lines, each. The concentrator FPGA board contains two zero bus turn around (ZBT) SRAMs with minimum capacity to hold 20, sixteen bit color images with CIF frame size, and an operating bandwidth of 166 MHz. High speed LVDS connections are provided for the concentrator FPGA board as a mean for data and control signal communication with the central FPGA module.

The architecture of the concentrator FPGA system is depicted in FIG. 14(b). The concentrator FPGA consists of five blocks. The arrow lines depicted in FIG. 14(b) demonstrate the image data flow inside the concentrator FPGA. Image data originating from the imagers/cameras 12 enters the concentrator FPGA via the camera channel input block. The data transmit multiplexer block multiplexes the 20 input camera channels and passes the timed multiplexed data to the memory controller block. The memory controller block stores the incoming image frame data inside one of the SRAMs; at the same time it also retrieves the previously stored image frame data from the other SRAM and hands it over to the image processing and application unit block. The SRAMs swap their role (i.e. one being written and one being read) each time a new image frame data is fully received. The image processing and application unit block are in charge of anticipated signal processing. In addition, some basic functionalities such as real-time single channel image capture, simultaneous capture of twenty image, single channel video display, etc are also considered for this block. The image processing and application unit block hands over its processed image data to the data link and control unit block. The data link and control unit block is in charge of transmitting the processed image data to the central FPGA module and servicing the control data requests received from the central FPGA module. To support the programmability feature of the cameras, a camera control block is also considered. The central FPGA can access this block through the data link and control unit block.

1) Concentrator FPGA Performance:

The concentrator FPGA functionality is categorized into two major tasks, regarding the captured image data. One is related to the multiplexing of the camera input channels and the other to the image processing application. Each of these operations imposes a minimum performance limit to the concentrator FPGA. The maximum of the two is considered as the minimum performance limit of the concentrator FPGA.

The concentrator FPGA for example must multiplex the incoming image data from twenty cameras 12. The cameras 12 output their image data on a per-line basis, assuming the synchronization of all the twenty cameras 12 connected to the concentrator FPGA. The concentrator FPGA first captures the incoming line from all the twenty cameras 12. While receiving the next line from the cameras 12, the concentrator FPGA also transmits the multiplexed version of the received previous line to one of the SRAMs. Thus the amount of time taken by the concentrator FPGA to transmit the multiplexed version of the received image data lines must be equal or less than the amount of time it takes for a single camera 12 (assuming all the cameras 12 to be the same) to transmit one line of image data. In mathematical form, this is expressed as:

$$Ncam \times \frac{Iw}{Ffgpa} \leq \frac{Cw}{Fcam} \qquad (16)$$

In (16), Iw represents the frame width of the image, Ffpga the concentrator FPGA clock frequency, Ncam the number of cameras 12 interfaced to the concentrator FPGA, Cw the cameras frame width and Fcam the rate at which the cameras 12 transmit their pixel data to the outside world. The first minimum required performance of the concentrator FPGA is obtained by solving inequality (16).

$$Ncam \times \frac{Iw}{Cw} \times Fcam \leq Ffgpa \qquad (17)$$

Another performance criterion reflects the amount of time a concentrator FPGA spends to conduct an image processing application. Irrespective of the type of the application, the real-time feature of the system requires that the image processing time be less than or equal to the amount of time a single camera 12 spends to generate one full frame. The amount of time needed for a typical camera 12 to generate one full frame is obtained from the frame rate. Hence the second performance requirement is obtained from the following inequality.

$$Tpc \leq \frac{1}{fps} \qquad (18)$$

Where fps is the camera frame per second rate, and Tpc is the image processing application process time. The value of Tpc is dependent on the concentrator FPGA operating clock frequency Ffpga and the architecture designed to conduct the image processing.

2) Concentrator FPGA Implementation:

The proposed architecture with only basic functionality support for its image processing and application unit block has been implemented and functionally verified on the concentrator FPGA. The latter concentrator FPGA must support 20 CIF imagers with a frame rate of 25 per second, translating to an aggregate bit rate of 0.75 Gb/s. The imagers frame width is 464 and their required operating frequency to produce a 25 frame per second output is 7.5 MHz. The minimum required operating frequency to support the multiplexing stage is derived using (17) at 114 MHz. The maximum operating frequency estimated by Xilinx Synthesis Tool (i.e. XST) for this architecture is 212 MHz. Table II summarizes the device utilization for the concentrator FPGA. 65% of logic resources and 80% of the allocated memory blocks remains free for further development of the image processing and application unit block.

TABLE II concentrator FGPA device utilization summary

| Resources | Used | Available | Utilization |
|---|---|---|---|
| Number of occupied slices | 2445 | 7200 | 34% |
| Number of slice register | 4608 | 28800 | 16% |
| Number of block RAM/FIFO | 10 | 48 | 20% |

B. Central FPGA

The main task devoted to the central FPGA consists of receiving data processed by the concentrator FPGAs, apply the final image processing stage, and transfer the final results to a PC through a USB link for displaying. The central FPGA board has been developed based on the concentrator board architecture, thus forming a scalable system. The performance requirement of the central FPGA module depends on the rate of the processed data which it receives from the concentrator FPGAs and the maximum local processing time (which is essentially expressed as (18)) needed to conduct the final image processing stage.

VI. Hardware Implementation

This Section elaborates the hardware design of the architectural blocks presented in FIG. 14(b). For the purpose of clarity and demonstration of the scalability of the system, the hardware design concept is primarily elaborated for a single FPGA board with twenty camera support, assuming that one single FPGA board acts as concentrator and central FPGA at the same time. A methodology is presented to scale the design on multiple FPGA boards to support higher number cameras 12 for the panoptic system.

A. Camera Input Channel Block (FIG. 15 (a) Illustrates a Camera Module Interface and FIG. 15 (b) Camera Frames)

The camera input channel block is in charge of interfacing the camera modules of the panoptic system with the FPGA. A camera module is a packaged camera 12 with an embedded lens and an external connector interface. The interface block diagram of the camera module is shown in FIG. 15(a). The master clock and the system reset of the camera module are denoted as CLK and RST respectively in FIG. 15(a). The camera module enters the power standby mode by activating the STDBY input. A two wire serial interface (i.e. I²C) is available for writing and reading the internal register settings of the camera module. The serial interface data and clock buses are denoted SDAT and SCLK respectively. The PDAT is the 8 bit pixel data output of the camera module. The PCLK is the pixel clock output of the camera module. The PDAT can be latched by external devices (FPGA in our case) at the rising or falling edge of PCLK. The polarity of the PCLK can be controlled. The VSYNC outputs the vertical synchronization pulse which indicates the start of a new frame. The HSYNC outputs the horizontal synchronization pulse. The HSYNC is active for the horizontal window of interest. The frame of the camera module has a rectangular geometry with Ch pixel rows and Cw pixel columns. A portion of camera frame pixels are effective image pixels. The effective pixels constitute the image capture window of the camera 12. The image window of a camera frame has Ih pixel rows and Iw pixel columns. A conceptual camera frame is depicted in FIG. 15(b). Standard image window sizes (i.e. Iw×Ih pixels) are available for camera modules such as VGA (i.e. 640×320), QVGA (i.e. 320×240) and CIF (i.e. 352×280). The frame sizes of Cw and Ch are camera dependent and vary from one camera module to another camera module. The camera module used in the presented panoptic device is preferably a PIXELPLUS PO4010N single chip CIF camera 12. This camera 12 has a frame size of 464×324 (i.e. Cw×Ch pixels). In the PO4010N camera module, pixel scanning starts from the top right corner of the camera frame and proceeds row by row downward; for each line, the scan direction is from right to the left. The VSYNC signal indicates the start of the image window region. The HSYNC signal indicates whether the output pixel data belongs to the image window region or not. The timing diagram of HSYNC with respect to VSYNC is provided in FIG. 16. The timing diagram of the output pixel data with respect to the camera module pixel clock, master clock and horizontal synchronization strobe is illustrated in FIG. 17. The activity of the HSYNC and VSYNC strobes in FIG. 16 and FIG. 17 are assumed high.

The PO4010N camera 12 supports an 8 bit mono color and several 16 bit color formats such as RGB565 and RGB Bayer for the presentation of the pixel data. The frame generation rate (i.e. fps) of the camera module is directly controlled by the master clock rate (i.e. Fmclk). The frame rate of the camera module is derived from the following equation.

$$fps = \frac{Fmclk}{2 \times Cw \times Ch} \quad (19)$$

Where Fmclk in (19) resembles the frequency rate of the master clock of the camera module. The number of pixels in the column and the row of the camera frame are indicated with Cw and Ch in (19) respectively. The maximum frame rate (i.e. fps) of the PO4010N camera module is 30 frames per second which is achieved with a master clock of 9 MHz. A frame rate of 25 per second is achieved for the PO4010N camera module with a master clock of 7.5 MHz.

1) Camera Interface Module:

The input channel block of the concentrator FPGA contains twenty camera interface modules. Each camera interface module is connected to a camera module. The architecture of the concentrator FPGA is shown in FIG. 18 with additional details. In FIG. 18, for the sake of clarity, the camera module connections to the camera control unit and the data link and control unit are not illustrated. The camera interface module captures the pixel data (i.e. PDAT) generated by the camera module on the rising edge of the pixel clock (i.e. PCLK) upon the condition that the horizontal (i.e. HSYNC) and vertical (i.e. VSYNC) synchronization strobes are active. When a horizontal line of pixel data is received, the camera interface module signals a transmission request via the REQ strobe to the data transmit multiplexer block. Upon reception of the acknowledgement of the transmission request via the ACK strobe, the camera interface module transmits the captured line of pixel data to the data transmit multiplexer block. The capture of the next line of pixel data is not halted while the previous line of pixel data is awaiting the transmission request response, or while it is transmitted to the next block. The camera interface module preambles the pixel data sent to the data multiplexer block with additional information concerning the camera number and the line number of the camera frame. These informations are used by the data multiplexer block, in later step. The pixel data path from the camera interface module to the data multiplexer module is indicated as the DATA bus in FIG. 18. The RDY strobe is to indicate the validity of the DATA bus. The camera interface module incorporates a single FPGA built-in dual-clock dual-port block RAM, see reference [13]. In addition to the temporary storage of the incoming pixel data from the camera module, the block RAM also accommodates the clock domain change from the camera module pixel clock (i.e. Fcam) to the FPGA system clock (i.e. Ffpga), see reference [13].

2) Camera Synchronization:

The proper operation of the panoptic device applications demand that all the cameras of the panoptic device be synchronized. Camera synchronization for the panoptic device is achieved by guaranteeing the same frame generation rate and the same vertical and horizontal timing diagram for all the cameras. Identical frame generation rate for all the cameras of the panoptic device is obtained by applying the same master clock to all the cameras 12. Identical horizontal and vertical timing diagrams for the cameras 12 are achieved by resetting and initializing (i.e. internal register setting) all the camera modules simultaneously.

B. Data Transmit Multiplexer Block

The simultaneous storage of the image frames generated by the camera modules in the single channel access SRAM segments of the FPGA boards requires time multiplexing. The data transmit multiplexer block receives the output ports of the camera interface modules as depicted in FIG. 18. The write internal interface of the SRAM memory controller block is controlled by the data transmit multiplexer block. The SRAM controller internal write interface has a 21 bit address line (i.e. ADDR W) and a 16 bit data line (i.e. DATA W) with an additional write enable (i.e. WE) strobe. This interface provides the write access to the memory space of the SRAM segments. Only one SRAM segment is available for read access and one is available for write access, at any time. The selection of which SRAM segment is available for the write access is done via SEL signal strobe. The SEL signal strobe is controlled by the data transmit multiplexer block. The data transmit multiplexer block also informs the image processing and application unit block of the arrival of the new frames of the cameras through the NF signal strobe.

1) Data Transmission Request Servicing:

The REQ strobes of the camera interface module is activated after the reception of each horizontal line of the camera image frame. The data transmit multiplexer block, parses the REQ strobes of the camera interface modules in a rotary fashion. There is no need for a priority based parsing of the REQ strobes since all the camera modules are synchronized and activate their REQ strobes at the same time. Hence as long as all the requests are acknowledged and serviced before the arrival of the next requests, no pixel data is lost. The required criteria for this matter is elaborated in the previous section and expressed in (17).

2) Camera Image Memory Storage:

The memory space of the two SRAMs of the FPGA board is equally partitioned into twenty camera image segments, each having the storage size of a sixteen bit CIF image. Pixel data of camera image frame are stored starting from the top memory position and finishing to the bottom memory position of each camera image segment. Each camera interface module preambles the row pixel data sent to the data transmit multiplexer block with the camera number and the row number of the frame being transmitted. The camera number is used to select the address offset of the target image segment and the row number is used to calculate the address offset position within the camera image segment. Hence the starting address of the ith camera's jth row pixel data transfer is derived from:

$$\alpha(i,j)=(Iw \times Ih) \times i + Iw \times j \quad (20)$$

Where Iw and Ih are the image frame width and frame height sizes in terms of number of pixels. The camera's number (i.e. i) ranges from 0 to 19, and the row number (i.e. j) ranges from 0 to Ih−1. The Iw and Ih values for a CIF camera are 352 and 288 respectively. Breaking (20):

$$\begin{cases} a(i,j) = b(i) + c(j) \\ b(i) = (Iw \times Ih) \times i \\ c(j) = Iw \times j \end{cases} \quad (21)$$

the address offset generation mechanism is implementable through addition of b(i) and c(j) solely. b(i) in (21) is implementable with a simple look-up table with twenty selectable entries, each representing the address offset of a camera segment. c(j) is implementable with a simple counter that counts at the pace of Iw and resets to zero for j=0. This is due to the fact that the row number j increments from 0 to Ih−1 synchronously for all the cameras. Hence the update of c(j) should only occur with the arrival of next row of pixel data.

3) Frame Update:

The transmission of row number zero (i.e. j=0) from the camera interface modules indicate the arrival of a new frame. Upon the arrival of a new frame the data transmit multiplexer block changes the target SRAM segment in charge of supporting the write access through the SEL strobe and informs the image processing and application unit block of the arrival of a new frame via the NF strobe.

C. SRAM Memory Controller Block

The SRAM memory controller block contains two zero bus turn-around (ZBT) SRAM controllers which interface through an external read and write access with two 36 Mb ZBT SRAMs. This block provides an internal write access port for the data transmit block and a read access port for the image processing and application unit block. The peripheral blocks can access the memory space of the SRAM segments using these internal ports. The configuration of this block only permits the simultaneous access of one SRAM as write and the other SRAM as read. The access type can switch between the two SRAMs via the SEL strobe. For more details regarding the ZBT SRAMs and their controller design in FPGA, the reader is referred to [14].

D. Image Processing and Application Unit Block (FIG. 19 which Illustrates the Image Processing and Application Block Diagram, where for the Sake of Clarity the Pertaining Sub-Blocks for Omnidirectional Vision Construction are Only Shown))

This Subsection elaborates the implementation of the omnidirectional vision construction using the panoptic camera at the architectural level. The reference algorithm used for the implementation of the omnidirectional vision construction is based on the detection of the nearest neighboring position. Hence the construction algorithm is limited to finding the closest camera 12 position to each pixel direction $\vec{\omega}$ and the contributing pixel position on the image frame of this camera 12. The hardware implementation of the latter algorithm illustrates the minimum hardware requirements for the implementation of a real-time omnidirectional vision construction system using the panoptic camera.

1) Angle Generation Module:

Each artificial pixel direction $\vec{\omega}$ on the surface of the panoptic camera is identifiable with a longitude angle $\varphi\omega$ and a latitude angle $\theta\omega$. The $\vec{\omega}$ is expressed in (22) in terms of $\varphi\omega$ and $\theta\omega$ $$\vec{\omega} = \sin\theta\omega \cos\varphi\omega \, \vec{x} + \sin\theta\omega \sin\varphi\omega \, \vec{y} + \cos\theta\omega \, \vec{z} \quad (22)$$

The sphere surface pixelization scheme shown in FIG. 7 provides Nθ latitude and Nφ longitude positions. The longitude and latitude angles of each pixel direction $\vec{\omega}$ in the scheme shown in FIG. 7 is derived from (23).

$$\begin{cases} \varphi_\omega(i) = \dfrac{2\pi}{N_\varphi} \times i \\ \theta_\omega(j) = \dfrac{\pi}{N_\theta} \times \left(j + \dfrac{1}{2}\right) \end{cases} \quad (23)$$

where in (23), i ranges from 0 to Nφ−1 and j ranges from 0 to Nθ−1. The presented scheme does not yield a homogeneous density of pixel positions over the surface of the sphere. The density of pixels is higher on areas closer to the north pole. Pixelization schemes exist which provide a homogeneous distribution of pixel positions over the surface of the sphere, see reference [15]. The latter pixelization scheme is opted over other schemes due to its regularity, ease and lower cost of implementation in terms of resources.

To generate the pixel direction vector $\vec{\omega}$ using (22), the φω and θω angles must be generated first. Utilizing the N bit binary presentation related to π expressed in (24) and assuming that both Nφ and Nθ are powers of 2, $$(a_0 a_1 \ldots a_{N-1}) = 2\pi \sum_{i=0}^{N-1} a_i \cdot 2^{-(i+1)} \quad (24)$$

$$a_i \in \{0, 1\}$$

the φω and θω are implementable using a simple accumulator for each angle. A N bit accumulator is depicted in FIG. 20(a). The N bit incrementing index (i.e. step) of the accumulator is denoted as K in FIG. 20(a) illustrating an N bit accumulator. To generate all possible combinations of φω and θω, one accumulator is chosen to increment only when the other accumulator completes its full range cycle. This concept is illustrated in FIG. 20(b). The φω and θω accumulators shown in FIG. 20(b) have separate incrementing indexes Kφ and Kθ respectively. The completion of the full range cycle of the φω accumulator is declared to the θω accumulator via an overflow detection module. The incrementing indexes Kφ and Kθ govern the resolution of the constructed omnidirectional vision. The highest resolution is achieved by choosing a value of one (i.e. the smallest incrementing step) for both of these indexes.

The angle generation module provide the latitude and the longitude angles of the pixel direction $\vec{\omega}$, which are denoted as PHI and THETA in FIG. 19, to the omega vector generation module. The omega vector generation module is informed of the availability of each new angle combination via the RDY ANG strobe.

2) Omega Vector Generation Module:

The omega vector generation module receives the φω and θω angles of pixel direction $\vec{\omega}$ and generates the unit vector $\vec{\omega}$ using (22). Utilization of trigonometric functions sin(2πx) and cos(2πx) are mandatory for the calculation of the $\vec{\omega}$ to vector from φω and θω angles. The implementation of trigonometric functions of sine and cosine have been the focus of the direct digital frequency synthesizers (i.e. DDFS) for the past decades. Hence many algorithms have been developed for the purpose of the implementation of the basic trigonometric functions. Look up table (LUT) based algorithms, see reference [16], the CORDIC algorithm, see references [17] [18], and polynomial approximation based algorithms, see reference [19] are the major categories in this field. The selection of requirements such as performance and available resources in the target platform.

To reduce the implementation cost of this module, two combined approaches are proposed. The first approach is replacing the multiplying trigonometric functions in $\vec{x}$ and $\vec{y}$ components of the $\vec{\omega}$ vector with their addition-based identities expressed in (25).

$$\sin(a)\cos(b) = \frac{1}{2}(\sin(a+b) + \sin(a-b)) \quad (25)$$

$$\sin(a)\sin(b) = \frac{1}{2(\cos(a-b) - \cos(a+b))}$$

Hence rewriting (22) yields:

$$\vec{\omega} = \frac{1}{2}(\sin(\theta_\omega + \varphi_\omega) + \sin(\theta_\omega - \varphi_\omega))\vec{x} + \quad (26)$$

$$\frac{1}{2}(\cos(\theta_\omega - \varphi_\omega) - \cos(\theta_\omega + \varphi_\omega))\vec{y} + \cos\theta_\omega \vec{z}$$

Thus two multiplication operations in (22) are reduced to one addition and one subtraction operation in (25). The second approach is applying resource sharing by using one SCC module and a finite state machine (i.e. FSM) to generate all the $\vec{x}$, $\vec{y}$ and $\vec{z}$ components of the $\vec{\omega}$ vector. The SCC module calculates the sine and cosine of an angle at the same time. The following angle combinations are inputted to the SCC module: (θω+φω), (θω−φω) and θω, then the respective sine and cosine outputs from the SCC modules are reordered and combined accordingly to obtain (26). The aforementioned concept is illustrated in FIG. 21(a) showing the internal architecture of the omega vector generation module with one sine and one cosine calculator module. The omega generation module passes out the calculated $\vec{\omega}$ vector denoted as OMEGA VEC in FIG. 19 to the maximum search module. The advent of a new $\vec{\omega}$ vector is declared via the OMG RDY strobe.

3) Maximum Search Module:

The task of the maximum search module is to find the nearest camera 12 position to the pixel direction $\vec{\omega}$. This task is accomplished by selecting the camera position for which the $\vec{t}$ vector's dot product with $\vec{\omega}$ is bigger than cos(α/2) and maximum. The maximum search module contains three submodules as shown in FIG. 21(b) illustrating the nearest camera position finder module. The dot product submodule conducts the dot product operation of two vectors, each having three $\vec{x}$, $\vec{y}$ and $\vec{z}$ components. The dot product operation is implementable with three signed multiplier and two adder units. The $\vec{t}$ vector component values of the cameras 12 are stored in a look-up table (LUT). The search unit submodule provides all the address indexes of the LUT via the ADDRESS bus shown in FIG. 21(b), to conduct the dot products of all the cameras $\vec{t}$ vectors with the newly presented $\vec{\omega}$ vector. At the same time the maximum dot product value and the camera index (i.e. the closest camera to the $\vec{\omega}$) which yields this value is obtained. The search unit submodule hands over the maximum dot product value, the closest camera index and the $\vec{\omega}$ vector, which are denoted as MAX OMG T, MAX INDEX and OMG VEC in FIG. 21(b), to the pixel position generation module. The transmission of a new output from this submodule is declared via the MAX RDY strobe.

4) Pixel Position Generation Module:

The pixel position generation module extracts the pixel position corresponding to the pixel direction $\vec{\omega}$ on the image frame of the camera 12 which is closest to vector $\vec{\omega}$. The pixel position on the image frame of an observing camera 12 in direction $\vec{\omega}$ is obtained by (15). Hence, the implementation of (15) is desired. FIG. 22 illustrates a block diagram for the implementation of the pixel position generation module. Both fraction terms in (15) contain a division of two vectors dot products, followed by multiplication by a constant (i.e. the focal length of the camera). The numerator of the fractions in (15) are calculated by two dot product submodules. The first input vector of the two dot product submodules are stored in two LUT's containing the $\vec{u}$ and $\vec{v}$ vectors of the cameras. The MAX INDEX input coming from the maximum search module is used to address these LUTs. The second input of the dot product submodules is the $\vec{\omega}$ vector. The denominator of the fractions and the multiplication by constant in (15) are identical, which is taken advantage of by only computing a single division operation and multiplying its result with the calculated dot products of the numerator terms in (15). The latter concept is illustrated in FIG. 22. The generated two-dimensional position indexes Xu and Xv are transformed to a one-dimensional domain address presentation through an address resolver submodule. This transformation is required since the image data of the camera 12 are stored in a single array SRAM memory. The output of the address resolver submodule is aggregated with the address offset of the camera segment closest to the pixel direction $\vec{\omega}$. The address offset of the camera segments maintained in the external SRAM memories are stored in a LUT. The addition in the last stage yields the address location of the pixel position of interest in the external SRAM memory. This address is passed to the SRAM memory controller for the retrieval of the target pixel position data.

5) Pixel Transfer Module:

The pixel transfer module receives the incoming data from the SRAM memory controller which is addressed by the pixel position generation module. To accommodate the scalability of the system, this module preambles the pixel data with the maximum $\omega t$. This information is used by the central FPGA. The pixel transfer module hands over its data to the data link and control unit through the PDAT bus, as shown in FIG. 19. The data link and control unit block transfers the received data to the central FPGA via high speed LVDS serial links.

6) Scalability and Central FPGA:

Each concentrator FPGA handles twenty camera modules and hence each will provide their pixel data to the central FPGA. The role of the central FPGA is to find which of the concentrator FPGAs generated the actual pixel data pertaining to the closest camera to pixel direction $\vec{\omega}$. This task is accomplished by finding the maximum among all the maximum wt provided by each concentrator FPGA. Hence the pixel data of interest is selected from the its respective concentrator FPGA and sent to the PC via a USB link for displaying or storing purposes. The FPGA device utilization summary of the algorithm presented in this Section is provided in Table III. The omega vector generation module of the implemented design uses a LUT based SSC block.

TABLE III device utilization summary of the omnidirectional constructions algorithm implementation

| Resources | Used | Available | Utilization |
| --- | --- | --- | --- |
| Number of occupied slices | 1771 | 7200 | 24% |
| Number of slice register | 3226 | 28800 | 12% |
| Number of block RAM/FIFO | 2 | 48 | 4% |
| Number of DSP48Es | 13 | 48 | 27% |

Applications

Web Conference/Cam

The panoptic system of the invention may be used in web conferencing applications, where a large portion of the scene is sensed in real time. The portion of the scene which is sensed typically consists of a 360 degree view of the upper portion of the scene. Some specific portions of the scene can be selected for processing, while other kept hidden. The Panoptic imager is connected to a computer which handles the videoconferencing software and the network connections.

The panoptic system enables zooming towards specified zones of interest in the scene, typically the speaker, some presented or projected document. This feature can be automatic or assigned manually. Speakers can be automatically detected via face detectors or special areas can be tagged by users or an event producer/director.

By automatically building a 3D model of the scene, the panoptic system automatically sends information about the 3D aspect of each participant. This information can be used at transmission or decoding time to restore eye contact between participants by automatically changing the effective viewpoint of users.

Security/Surveillance

The panoptic system enables full view of the scene as well as processing of specific operations in real time, such as feature extraction, movement detection. This system can be used to monitor large areas simultaneously, where standard mechanically controlled cameras can only view a small portion of the scene, and necessarily have a large portion of the scene unobserved, at all times.

The panoptic system also enables performing specific image or video processing of specific areas of the scene, while still keeping the ability to observe the full scene, at any time. For example, zooming can be performed onto a specific area, while still observing the full scene, in real time.

Panoptic systems of various sizes can be placed in various positions, on fixed or moving objects.

Because the panoptic system senses the depth of the scene, a Panoptic-based surveillance system does not require on-site calibration and can be deployed faster than conventional cameras.

Live Broadcast

The panoptic system may be used for life broadcast of events such as sports events or concerts. In this case, applications such as omnidirectional vision, three-dimensional vision, and adaptive point-of-vision are performed either in real-time broadcasting or video post-processing. The panoptic camera may cover the full 360 degree, or only a portion of the scene. An operator can send control parameters to one or several panoptic cameras requesting one or several particular virtual synthesized views of the scene.

Several panoptic systems can be connected to a central computer to enable a full view of the scene, and remove occlusions in the scene.

If the panoptic system is embarked on a moving platform, shake or vibrations can be compensated by synthesizing virtual views whose motion compensates the vibration. The shake/vibration can be estimated by any standard method and this information used live or in post-production to correct the acquired scene.

Personal Device, Car, Traffic

The panoptic system may be used as a distance detection device. It is mounted on several locations of a vehicle and extracts the distances to other vehicles and surrounding objects in real time. Each of the panoptic device in this case covers a limited portion of the scene.

Image Formation for Restoring the Vision

The panoptic system may be used to capture real time video of the scene in front of a person. This information is used to construct high-quality stereoscopic images. Each of the two constructed images is sent in real time to retina implant that are used to restore the vision of the blind.

In neuroscience studies, the Panoptic camera can be used as computational system to emulate vision in the human eye, and all pathways to the visual cortex.

A lightweight Panoptic system can also be mounted on a wearable embedded system. It computes omnidirectional depth map that are then used with a sound synthesizer to provide feedback about nearby obstacles for view-impaired persons.

Medical Imaging (Ultrasound)

The sensors of the panoptic system may be of many different types, the main constraint on them being their directionality, which must be guaranteed.

Ultrasound imaging in medical application can take benefit of the panoptic system, where the internal of a living body is monitored by a panoptic system comprising an ultrasound emission systems, and a number of ultrasound sensors placed in a Panoptic arrangement, i.e. on a surface which guarantees each microphone a different location and directional angle, in accordance with the principle of the present invention. A three-dimensional image of the observed tissue or organ can be reconstructed.

Architecture Measurements

The panoptic system has the ability to extract the depth map of its surroundings in real time, and without the necessity to perform any calibration on the spot. This capability is used in architectural measurements, where the panoptic cameras records the depth map, while the final three dimensional reconstruction of some are is performed by a computer, using the database produced by the panoptic cameras.

Robot Navigation

Navigation application of mobile vehicles or robots or flying vehicles or robots can make use of the panoptic system to compute several actions such as distance estimation with neighboring objects, computation of the image flow, recording of the landscape that has been visited.

In biomedical robotic applications, the panoptic system can be mounted on any invasive visual inspection system, such as a robotic pill that is ingested and enables screening the digestive system.

The embodiments described above are only exemplary non-limiting examples of the present invention. Variations using equivalent means are possible within the spirit and scope of the present invention. Also, the different embodiments and variations may be combined together, in order for example to form multiple sensors not limited to image sensors according to the principle of the present invention.

REFERENCES (ALL INCORPORATED BY REFERENCE IN THE PRESENT APPLICATION)

[1] R. Zbikowski, "Fly like a fly [micro-air vehicle]," Spectrum, IEEE, vol. 42, no. 11, pp. 46-51, 2005.
[3] C. Geyer and K. Daniilidis, "Catadioptric projective geometry," International Journal of Computer Vision, vol. 45, no. 3, 2001.
[4] "e-puck," http://www.e-puck.org/.
[5] "viewplus," http://www.viewplus.co.jp/products/sos/astro-e.html.
[6] L. P. Lee and R. Szema, "Inspirations from biological optics for advanced photonic systems," Science, 2005.
[7] K.-H. Jeong, "Biologically inspired artificial compound eyes," Science, 2006.
[8] Neumann, J.; Fermuller, C.; Aloimonos, Y., "A hierarchy of cameras for 3D photography," First International Symposium on 3D Data Processing Visualization and Transmission, vol., no., pp. 2-11, 2002.
[9] F. Aurenhammer, "Voronoi diagrams a survey of a fundamental geometric data structure," ACM Computing Survey, vol. 23, no. 3, pp. 345-405, 1991.
[10] M. D. Berg, M. V. Kreveld, M. Overmars, and O. Schwarzkopf, Computational Geometry, 2nd revised ed., Berlin: Springer 2000.
[11] R. Hartley, A. Zisserman, Multiple View Geometry in Computer Vision, 2nd ed., Cambridge University Press 2003.
[12] D. Raboud, "The Panoptic Camera—Plenoptic interpolation in an omnidirectional polydioptric camera", M. S. Thesis, EPFL, Lausanne, VD, Switzerland, 2009.
[13] S. Kilts, Advanced FPGA Design: Architecture, Implementation, and Optimization, New York: Wiley IEEE press 2007.
[14] Xilinx, Appl. Note 136.
[15] "HEALPix," [Online]. Available: http://healpix.jpl.nasa.gov/. [Accessed on Jan. 31, 2010].
[16] J. Tierney, C. Rader, and B. Gold, "A digital frequency synthesizer," IEEE Trans. Audio Electroacoustcis, vol. 19, no. 1, pp. 48-57, 1971.
[17] J. E. Voider, "The CORDIC Trigonometric Computing Technique," IRE Transactions on Electronics Computers, pp. 330-334, 1959.
[18] J. Walther, "A Unified Algorithm for Elementary Functions," in Proceedings of Spring Joint Computer Conference 1971, pp. 379-385.
[19] U. Meyer-Baese, Digital Signal Processing with Field Programmable Gate Arrays, 3rd ed., Berlin: Springer 2007.

The invention claimed is:

1. A sensing device comprising:
a plurality of sensors to capture light intensity values and light direction information of incoming light, each sensor comprising a plurality of sensor pixels, each sensor pixel having a sensor pixel field of view; the plurality of sensors being arranged on a support of predetermined shape to acquire light from directions observable by the plurality of sensors;

an image constructor configured to generate an image comprising a plurality of image pixels, and configured to generate an image pixel observation direction for each image pixel, the image pixel observation direction being a viewing direction from the image pixel for which an image pixel intensity value of the image pixel is determined; the image constructor being further configured to receive image pixel intensity values form and image pixel intensity generator and to construct said image using the received image pixel intensity values;

a sensor pixel position generator configured to determine, for each image pixel observation direction, at least one sensor having said image pixel observation direction in or closet to its sensor pixel field of view; and an image pixel intensity generator configured to determine, for each image pixel observation direction, an image pixel intensity value based on the at least one sensor pixel intensity value of said at least one sensor pixel.

2. The sensing device as defined in claim 1, wherein the plurality of sensors and their processing node are placed in a network or an interconnected network arrangement in order to guarantee a target data routing and throughput quality of service, and dynamic load balancing of tasks among neighboring processing nodes.

3. The sensing device as defined in claim 1, wherein the sensors are cameras with different frame rates and triggers and are used to reconstruct images or videos at frame rates higher than an individual frame rate of any one of the plurality of sensors used.

4. The sensing device as defined in claim 1, wherein the plurality of signal processing algorithms causes the sensing device to use light field interpolation to render a stereo pair of omnidirectional images.

5. The sensing device as defined in claim 1, wherein the plurality of signal processing algorithms causes the sensing device to compute an omnidirectional depth map.

6. A system comprising a sensing device as defined in claim 1, a computer, and a rendering means for rendering information sensed by the sensing device.

7. A system as defined in claim 1, wherein the rendering means is a display and the information is image related information.

8. The sensing device according to claim 1, wherein the image reconstruction is omnidirectional image reconstruction and the device further comprises dedicated hardware to carry out the omnidirectional image reconstruction based on the captured light intensity values and light direction information of the incoming light.

9. The omnidirectional sensing device according to claim 1, wherein each sensor of said plurality of sensors has a different focal plane compared to the focal plane of each other sensor of said plurality of sensors.

10. The omnidirectional sensing device according to claim 1, wherein the plurality of sensors is arranged on the support such that neighboring sensors have overlapping fields of view.

11. The omnidirectional sensing device according to claim 9, wherein the focal plane of each of the plurality of sensors is offset from the focal plane of every other sensor by rotation along at least two perpendicular axes of rotation.

12. The sensing device as defined in claim 1, wherein the image constructor is configured to define an image pixel position of each image pixel relative to the support of the sensing device; and to define for each image pixel, an image pixel observation line given by the image pixel position and the image pixel observation direction.

13. The sensing device as defined in claim 12, wherein the sensor pixel position generator is configured to determine, for an image pixel observation point on each image pixel observation line, at least one sensor pixel having said point in or closest to its sensor pixel field of view, said image pixel observation point having a specific distance from the sensing device.

14. The sensing device as defined in claim 12, wherein the image pixel intensity generator is configured to determine said image pixel intensity value, for each image pixel, using the sensor pixel intensity value of the sensor pixel in the sensor having the smallest distance from the image pixel observation line.

15. The sensing device as defined in claim 1, wherein the image pixel intensity generator is configured to determine said image pixel intensity value, for each image pixel, using an interpolation of sensor pixel intensity values from a plurality of sensor pixels.

16. The sensing device as defined in claim 1, wherein the image constructor is configured to generate image pixel observation directions to implement pan, tilt or zoom functions.

17. The sensing device as defined in claim 1, comprising a video generator for rendering the image generated by the image constructor.

18. The sensing device as defined in claim 1, comprising an observation direction distance generator configured to determine, for a plurality of observation directions, using a disparity algorithm on image pairs from sensor pairs with overlapping fields of view, a distance to observable surroundings of the sensing device.

19. The sensing device as defined in claim 13, comprising two image constructors configured to generate two aligned but spatially separated images to provide stereoscopic vision.

20. The sensing device as defined in claim 1, where each sensor includes a processing node configured to handle sensor specific processing tasks, thereby offloading a central processing unit configured to handle processing tasks common to all sensors.

* * * * *